United States Patent [19]
Weilant et al.

[11] Patent Number: 5,465,819
[45] Date of Patent: Nov. 14, 1995

[54] POWER TRANSMITTING ASSEMBLY

[75] Inventors: David R. Weilant, Muncie, Ind.; Craig Fowler, Maumee, Ohio

[73] Assignee: Borg-Warner Automotive, Inc., Sterling Heights, Mich.

[21] Appl. No.: 195,922

[22] Filed: Feb. 14, 1994

Related U.S. Application Data

[63] Continuation-in-part of Ser. No. 954,855, Sep. 29, 1992, abandoned, and Ser. No. 111,190, Aug. 27, 1993, abandoned.

[51] Int. Cl.⁶ .................................................. F16D 27/04
[52] U.S. Cl. ........................ 192/35; 192/48.2; 192/40; 192/93 A; 192/54.1
[58] Field of Search ........................ 192/35, 40, 54, 192/92, 93 A, 84 C, 67 A, 48.2; 188/247

[56] References Cited

U.S. PATENT DOCUMENTS

| | | | |
|---|---|---|---|
| 3,656,598 | 4/1972 | Goble | 192/35 |
| 3,769,533 | 10/1973 | Pauwels | 310/155 |
| 4,163,486 | 8/1979 | Kagata | 192/35 |
| 4,192,411 | 3/1980 | Fogelberg | 192/36 |
| 4,281,749 | 8/1981 | Fogelberg | 192/49 |
| 4,282,959 | 8/1981 | Schachner | 192/35 |
| 4,327,821 | 5/1982 | Telford | 192/35 |
| 4,415,073 | 11/1983 | Campbell et al. | 192/54 |
| 4,420,069 | 12/1983 | Ishiwata et al. | 192/35 |
| 4,441,597 | 4/1984 | Teraoka | 192/35 |
| 4,470,491 | 9/1984 | Teroaka | 192/35 |
| 4,538,714 | 9/1985 | Kagata et al. | 192/54 |
| 4,557,358 | 12/1985 | Petrak | 192/35 |
| 4,620,622 | 11/1986 | Onodera et al. | 192/36 |
| 4,694,943 | 9/1987 | Petrak | 192/35 |
| 4,718,527 | 1/1988 | Kurihara | 192/54 |
| 4,776,234 | 10/1988 | Shea | 74/710.5 |
| 4,782,720 | 11/1988 | Teraoka et al. | 74/650 |
| 4,811,824 | 3/1989 | Kurihara | 192/35 |
| 4,854,434 | 8/1989 | Kurihara | 192/35 |
| 4,953,670 | 9/1990 | Chemelewski | 188/181 |
| 4,955,853 | 9/1990 | Bausch | 475/241 |
| 5,030,181 | 7/1991 | Keller | 475/150 |
| 5,041,069 | 8/1991 | Horst | 475/231 |
| 5,092,436 | 3/1992 | Sterler | 192/4 |
| 5,092,825 | 3/1992 | Goscenski, Jr. et al. | 475/150 |
| 5,105,900 | 4/1992 | Adler et al. | 180/247 |
| 5,105,902 | 4/1992 | Wilson et al. | 180/247 |
| 5,107,972 | 4/1992 | Sundquist | 192/35 |
| 5,123,513 | 6/1992 | Petrak | 192/85 |

FOREIGN PATENT DOCUMENTS

| | | |
|---|---|---|
| 0151858 | 8/1985 | European Pat. Off. |
| 1156141 | 6/1989 | Japan |
| 985036 | 3/1965 | United Kingdom |
| 2055998 | 3/1981 | United Kingdom |
| 1319133 | 6/1983 | United Kingdom |
| 2249360 | 5/1992 | United Kingdom |

Primary Examiner—Andrea L. Pitts
Attorney, Agent, or Firm—Reising, Ethington et al.; Greg Dziegielewski

[57] ABSTRACT

A power transmitting assembly includes a first rotatable assembly, a second rotatable assembly having an axially movable rotating member, a camming assembly for moving the rotating member and an electromagnetic clutch for activating the camming assembly. The rotating member is moved between a first position where the first rotatable assembly operatively engages the second rotatable assembly and a second position where the first rotatable assembly is disengaged from the second rotatable assembly. The power transmitting assembly is shown in three forms—a locking hub assembly, a lockable differential assembly and axle assembly having an axle disconnect.

51 Claims, 19 Drawing Sheets

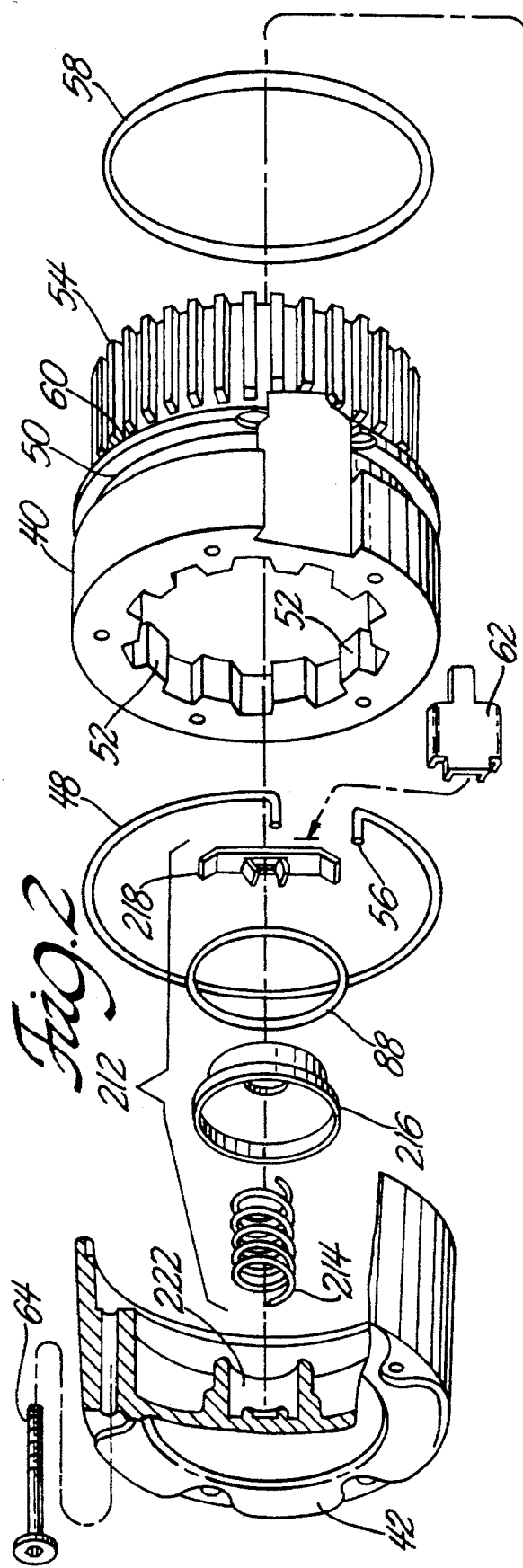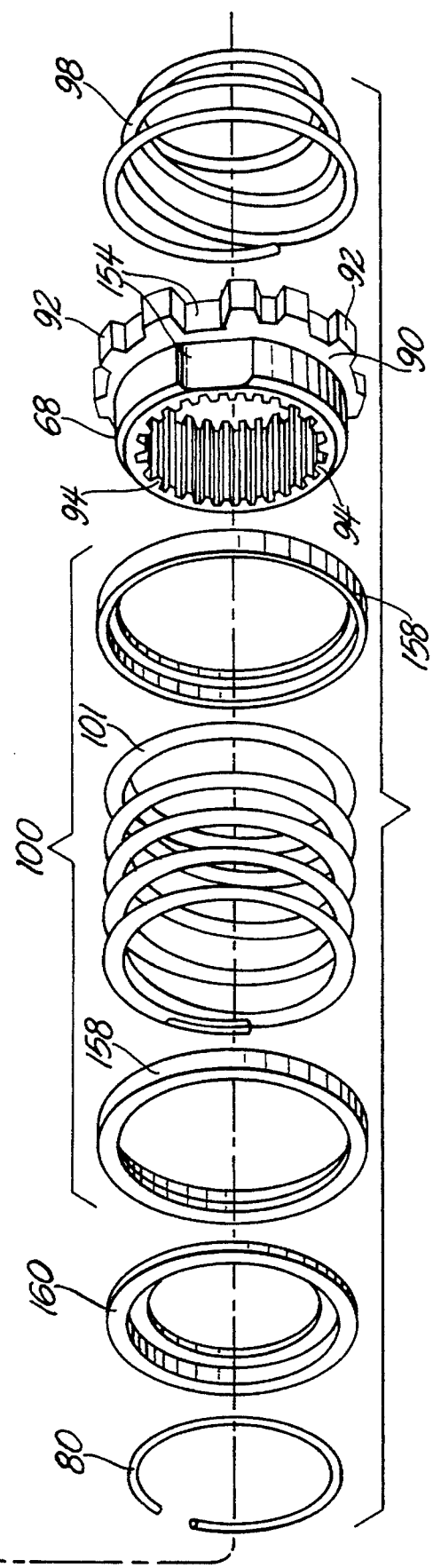
Fig. 2

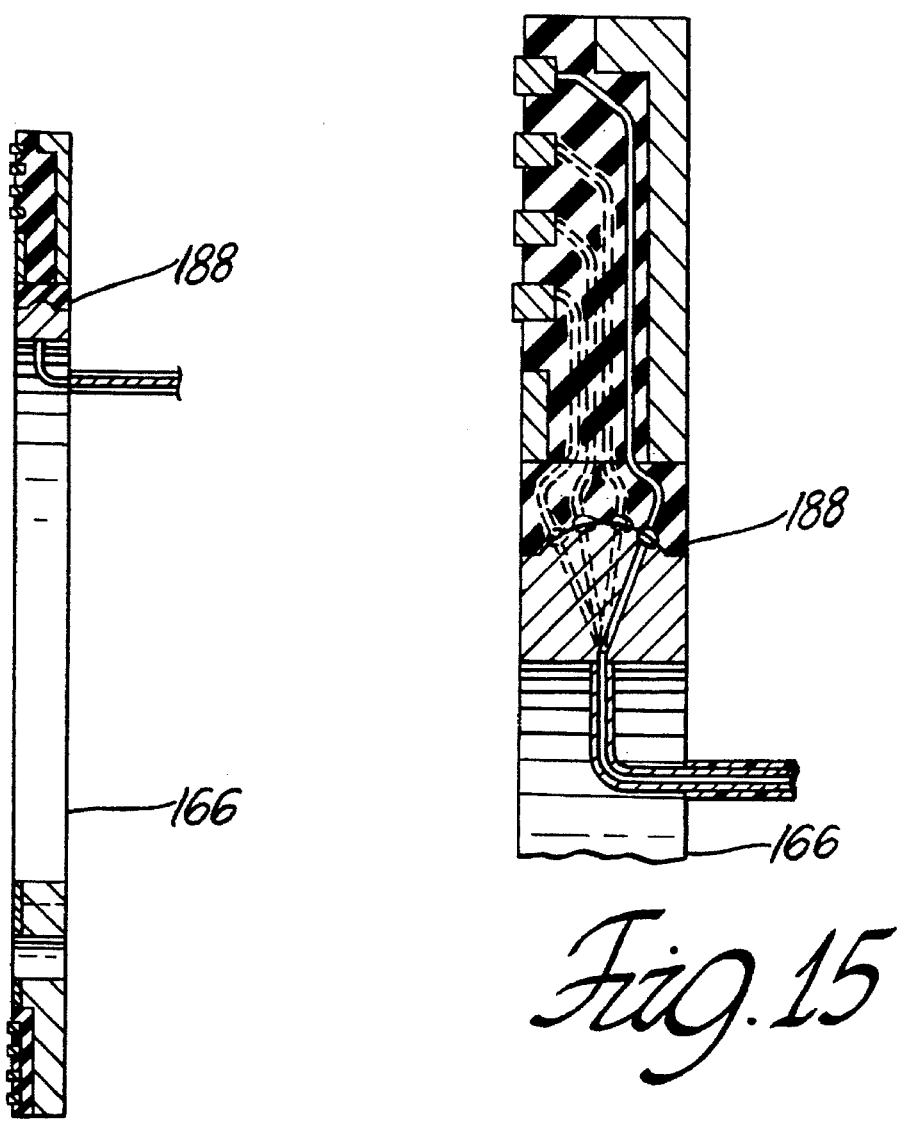
Fig. 15
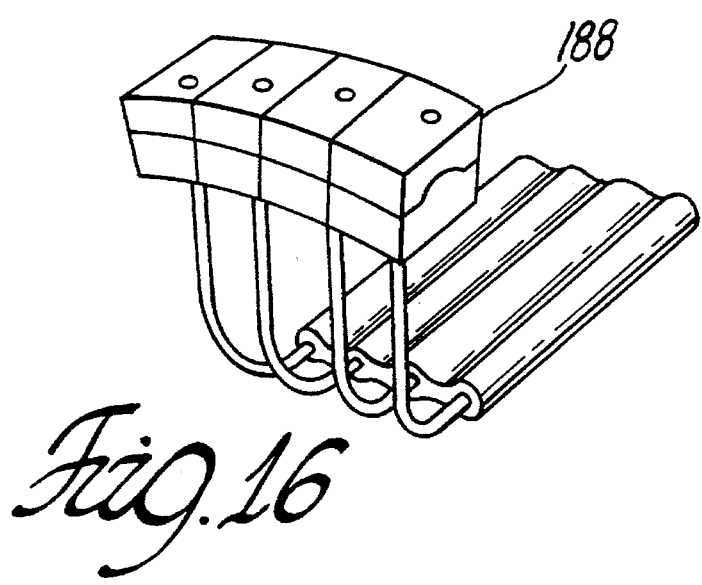
Fig. 14
Fig. 16

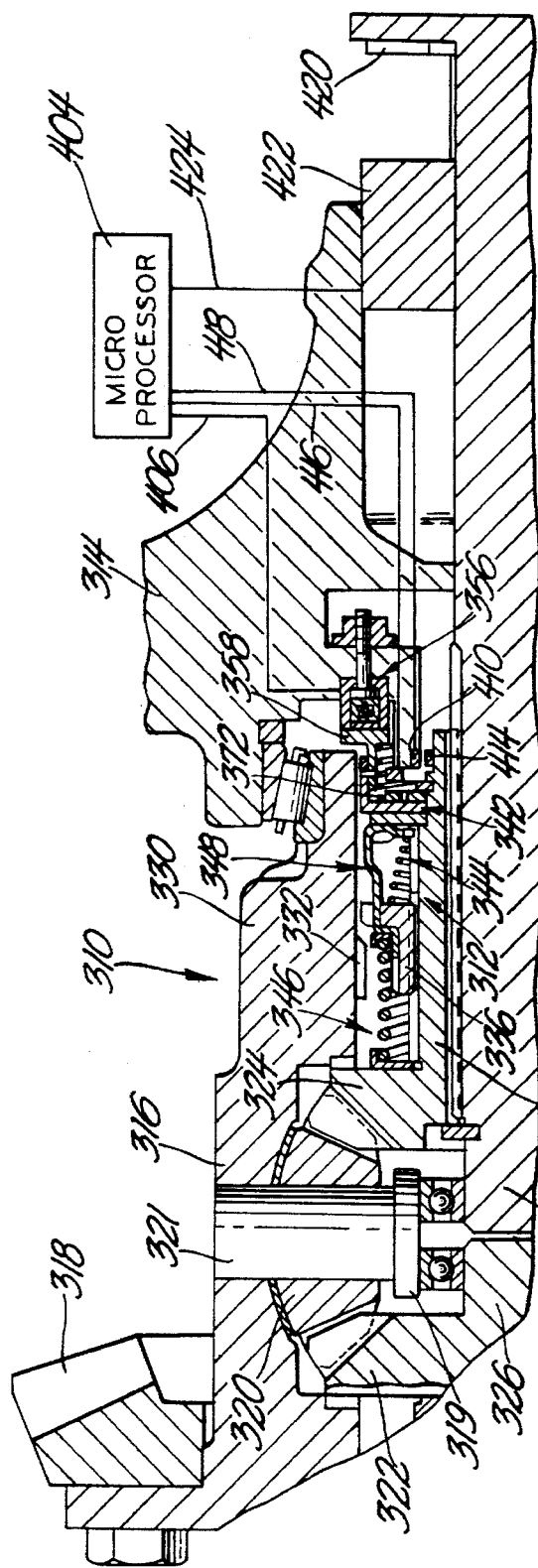

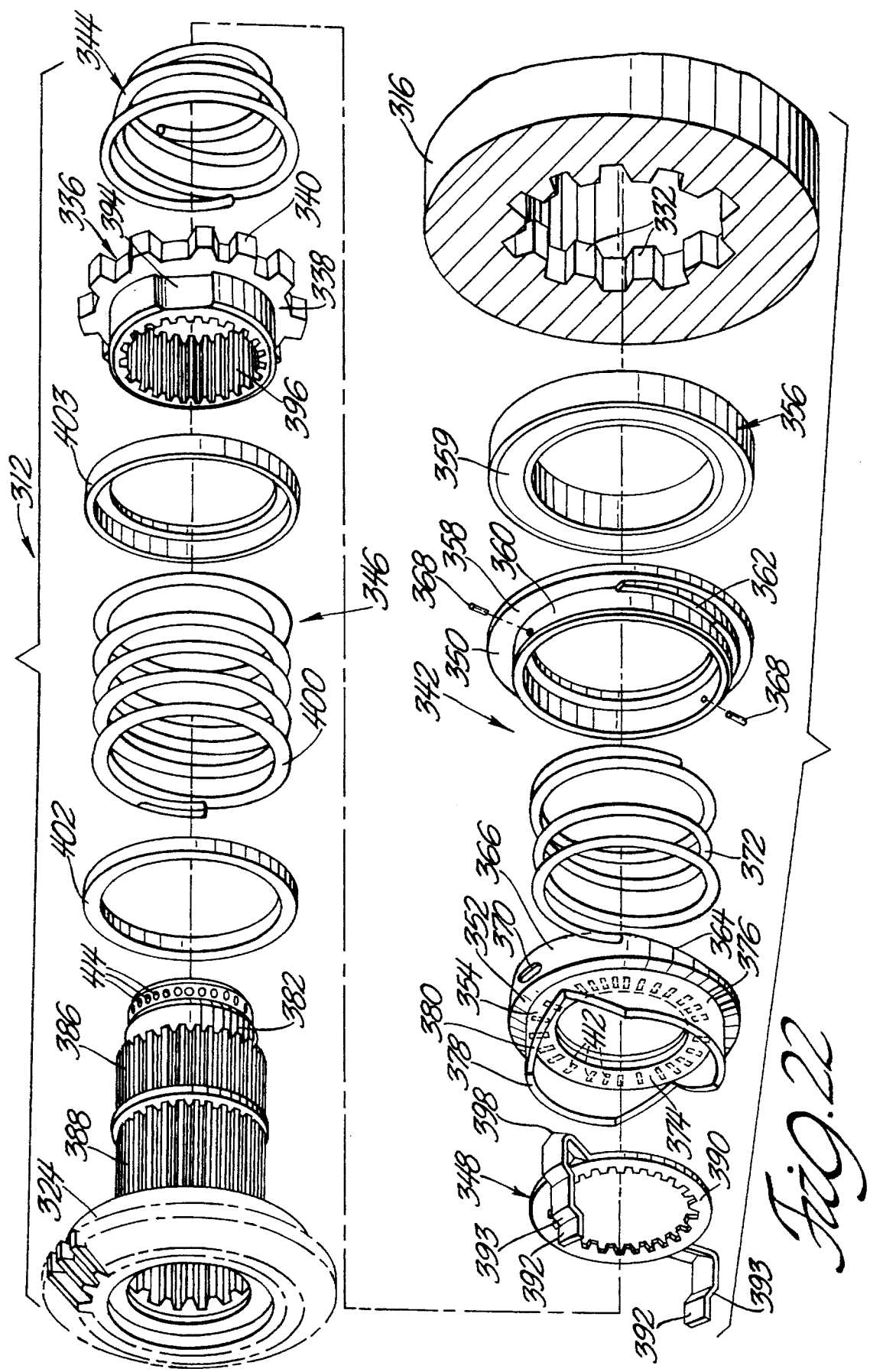

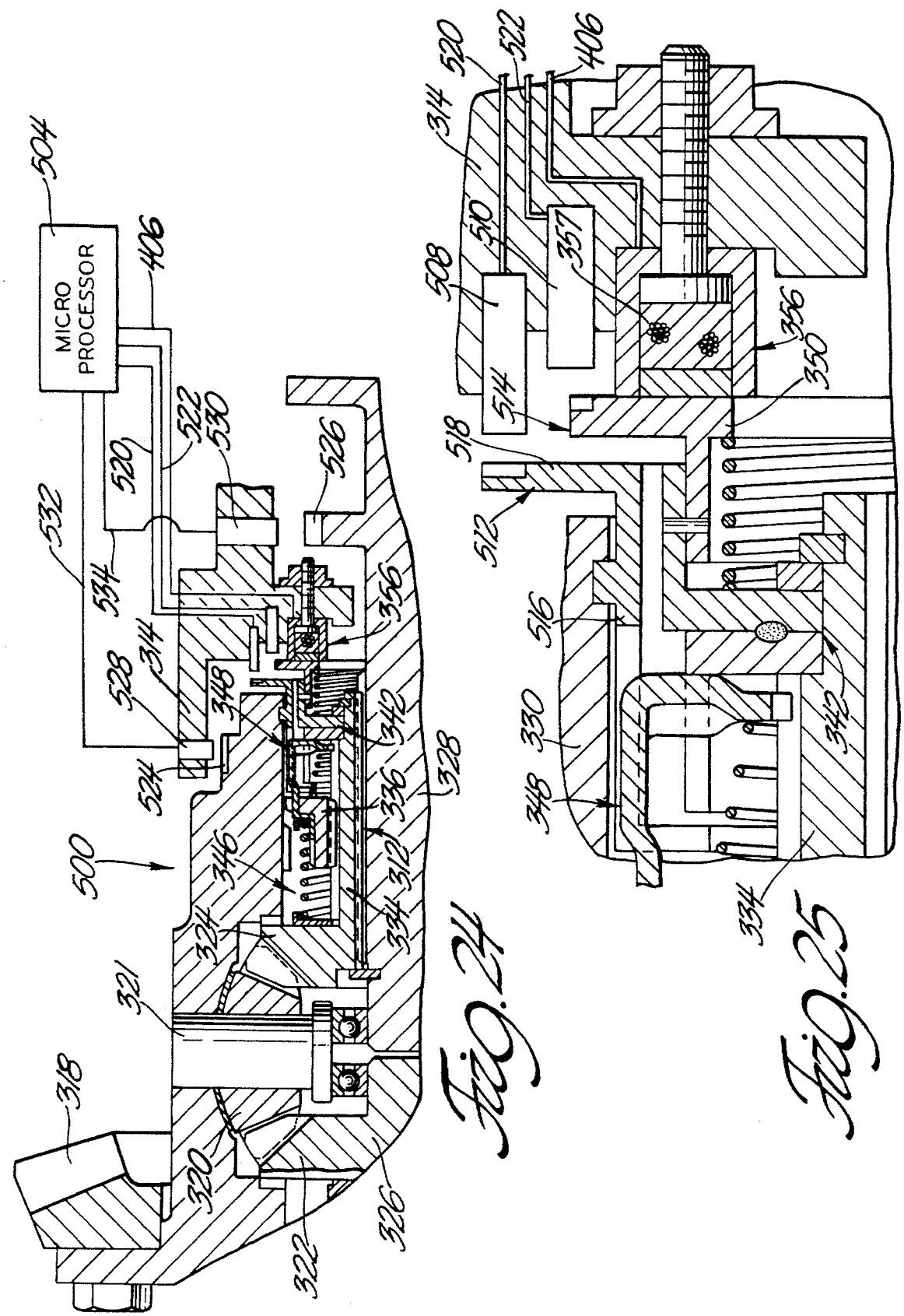

POWER TRANSMITTING ASSEMBLY

This is a continuation-in-part of U.S. patent application, Ser. No. 07/954,855 filed Sep. 29, 1992 entitled "Automatic Locking Hub Assembly" and of U.S. patent application, Ser. No. 08/111,190 filed Aug. 27, 1993 entitled "Power Transmitting Assembly", both now abandoned.

BACKGROUND OF THE INVENTION

The earlier patent applications respectively disclose several embodiments of an electromagnetically actuated locking hub assembly for part time four wheel drive vehicles and a locking differential assembly where one drive member of the differential is locked to another drive member of the differential for changing the mode of operation of the differential.

This patent application includes an axle disconnect assembly in addition to the power transmitting devices disclosed in the earlier patent applications.

Locking hub assemblies and axle disconnect assemblies are used in part time four wheel drive vehicles to disconnect the nondriven wheels in the two wheel drive mode to prevent back drive which causes unnecessary power consumption and wear.

The initial approach employed locking hub assemblies on the optionally driven wheels, normally the front wheels, that were manually disengaged to allow the optionally driven wheels to rotate independently of their drive axle. The major drawback of the locking hub is that the assemblies require the vehicle operator to lock or unlock each hub assembly manually to engage or disengage the optionally driven wheels from their drive axle. This approach is still used in some off road type four wheel drive vehicles but is generally regarded as unsatisfactory in highway type four wheel drive vehicles due to the requirement for manual operation.

A well known alternative to manually operated locking hub assemblies is an automatic locking hub assembly that engages automatically when power is applied to the front or optional drive axle in the four wheel drive mode.

An automatic locking hub assembly is disclosed in U.S. Pat. No. 4,192,411 granted to Mark J. Fogelberg Mar. 11, 1980 for an Automatic Locking Clutch and assigned to the Borg-Warner Corporation. This automatic locking hub assembly engages a drive axle and an associated wheel upon engagement of a four-wheel drive system, maintains engagement positively in the drive and coast modes of operation as well as during the transition between drive and coast, maintains engagement positively in the forward and reverse modes of operation as well as during the transition between forward and reverse and disengages automatically upon a slight direction reversal when the four-wheel drive system is disengaged. However, the automatic locking hub assembly uses a ring which develops high frictional drag to effect clutch engagement and which maintains this high frictional drag after clutch engagement even though it is not required to maintain clutch engagement.

The automatic locking hub assembly disclosed in U.S. Pat. No. 4,281,749 granted to Mark J. Fogelberg Aug. 4, 1981 for an Automatic Locking Clutch and assigned to the Borg-Warner Corporation incorporates several improvements including a wrapped spring to effect clutch engagement through a camming and load spring arrangement. The wrapped spring is tightened to develop the high frictional drag necessary for clutch engagement but then is loosened after clutch engagement to reduce frictional drag to a minimum. Use of the camming and load spring arrangement to effect clutch engagement also prevents gear clash and a prolonged blockage of clutch engagement which could be harmful to the wrapped spring.

Other alternatives have been employed to actuate a locking hub assembly such as by the use of a supplementary power source to actuate a locking hub assembly such as by the use of a supplementary power source to actuate a drive gear, or to employ pneumatic systems where vacuum or pressure motors or valves cause the drive gear to engage or disengage by spring pressure when the vacuum or fluid is removed, or to employ a solenoid for activating a drive gear into dynamic engagement.

For example, U.S. Pat. No. 4,694,943 granted to Harry A. Petrak Sep. 27, 1987 for a Ground Clutch Assembly discloses a ground clutch assembly in association with either an axle disconnect or a wheel hub that converts a vehicle from two-wheel drive to four-wheel drive and vice-versa by means of a camming assembly and a solenoid operated shift mechanism so that a moving vehicle can be converted without need to stop the vehicle, back up or change vehicle direction. The shift mechanism temporarily locks the camming assembly against rotation in advancing a drive gear into driving engagement with a receiving gear in converting to four-wheel drive. The camming assembly is also temporarily locked against rotation by the solenoid operated shift mechanism in disengaging the drive gear from the receiving gear in converting to two-wheel drive.

It will be appreciated that a solenoid operated locking hub assembly is more flexible in operation because the assembly responds to an electrical signal. Consequently the engagement and disengagement of the locking hub assembly can be controlled by the vehicle operator and/or activities of other power train components. However, the Petrak arrangement has a very complicated camming assembly that is operated by the solenoid for engaging or disengaging the locking hub assembly when the solenoid electromagnet is energized. Other drawbacks include lack of any provision for preventing gear clash when the drive gear is shifted into engagement with the receiving gear and use of a rotatable electromagnet for the solenoid that is energized by an onboard radio receiver and battery.

It is also known from U.S. Pat. No. 5,030,181 granted to Walter Keller Jul. 9, 1991 to provide a bevel gear differential that has a solenoid operated gear clutch for positively locking one of the side gears to the differential case. The solenoid operated gear clutch includes an armature plate that is attached to a sleeve that is slidably splined on the shaft of side gear and that has clutch teeth. When the electromagnet is energized, sleeve slides to the right as viewed in FIG. 1 of the patent drawing to engage the clutch teeth of the sleeve with cooperating clutch teeth on the case locking the side gear to the case. When the electromagnet is deenergized, the clutch is disengaged by a return spring. This arrangement requires a continuous energization of the electromagnet for clutch engagement. Another drawback of the arrangement is that it lacks any provision for preventing gear clash when the sleeve is shifted into engagement with the clutch teeth of the differential case.

SUMMARY OF THE INVENTION

Broadly the object of the present invention to provide a lockable power transmitting assembly that includes a gear clutch or lock or changing operational modes, such as a locking hub assembly, an axle disconnect assembly or a lockable differential assembly that takes advantage of electromagnetic actuation while avoiding one or more drawbacks noted above.

A feature and advantage of the invention is that it provides a lockable power transmitting assembly that is electromagnetically actuated by a nonrotatable electromagnet which simplifies electrical power and signal communication.

Another feature and advantage of the invention is that it provides a lockable power transmitting assembly that is actuated by an electromagnetic clutch which permits the use of a simple and rugged camming assembly for effecting dynamic operational mode changes.

Another feature and advantage of the invention is that it provides a lockable power transmitting assembly that is operated by a camming assembly that is grounded solely by an electromagnetic clutch to effect dynamic operational mode changes so that auxiliary devices for grounding the camming assembly that complicate the camming assembly are not necessary.

Still another feature and advantage of the invention is that it provides a lockable power transmitting assembly that is operated by an electromagnetic clutch and a simple and rugged camming assembly that cooperate so that the electromagnetic clutch does not require continuous energization to main a mode of operation for the power transmitting assembly.

Yet another feature and advantage of the invention is that it provides a lockable power transmitting assembly that is operated by an electromagnetic clutch and a simple and rugged camming assembly that cooperates with a load spring arrangement to effect dynamic gear clutch engagement without danger of gear clash.

An optional feature and advantage of the invention is that it provides a lockable power transmitting assembly that is operated by an electromagnetic clutch and a camming assembly that enhances the torque capacity of the electromagnetic clutch responsive to operational mode changes.

BRIEF DESCRIPTION OF THE DRAWINGS

The above and other objects, features and advantages of the invention will become more apparent from the following description taken in conjunction with the accompanying drawings wherein like references refer to like parts and wherein:

FIGS. 2–4 are an exploded view of an automatic locking hub in accordance with one embodiment of the present invention;

FIG. 14 is a cross-sectional view of the powered washer of FIG. 13 taken along line 14—14;

FIG. 15 is an enlarged partial view of the powered washer of FIG. 13—13 taken along line 15—15;

FIG. 16 is an enlarged partial perspective view of the connector portion of the powered washer of FIG. 13;

FIG. 20 is a fragmentary sectional view of a differential having a lock in accordance with the invention;

FIG. 21 is a top view of internal components of the differential shown in FIG. 20;

FIG. 22 is an exploded perspective view of the locking components shown in FIG. 20; and FIG. 23 is an enlargement of a portion of FIG. 20;

FIG. 24 is a fragmentary sectional view of a differential having an alternative lock in accordance with the invention; and FIG. 25 is an enlargement of a portion of FIG. 24.

DESCRIPTION OF THE INVENTION

Figure 1:
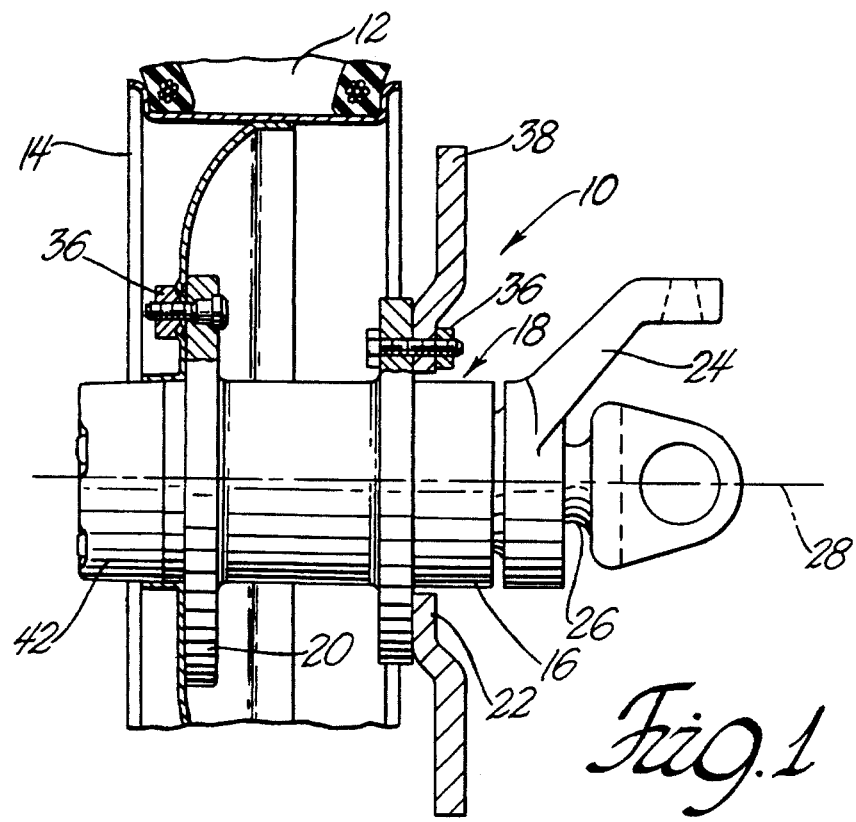
FIG. 1 is an enlarged partial cross sectional view of a wheel hub assembly of a vehicle including a tire, wheel, automatic locking hub, axle and steering mechanism.

In the following description, like reference numerals designate like or corresponding parts. Also in the following description it is to be understood that terms such as "forward" and "rearward" and the like are words of convenience to assist in the relative description of a component or element with respect to another component or element.

Figure 3:
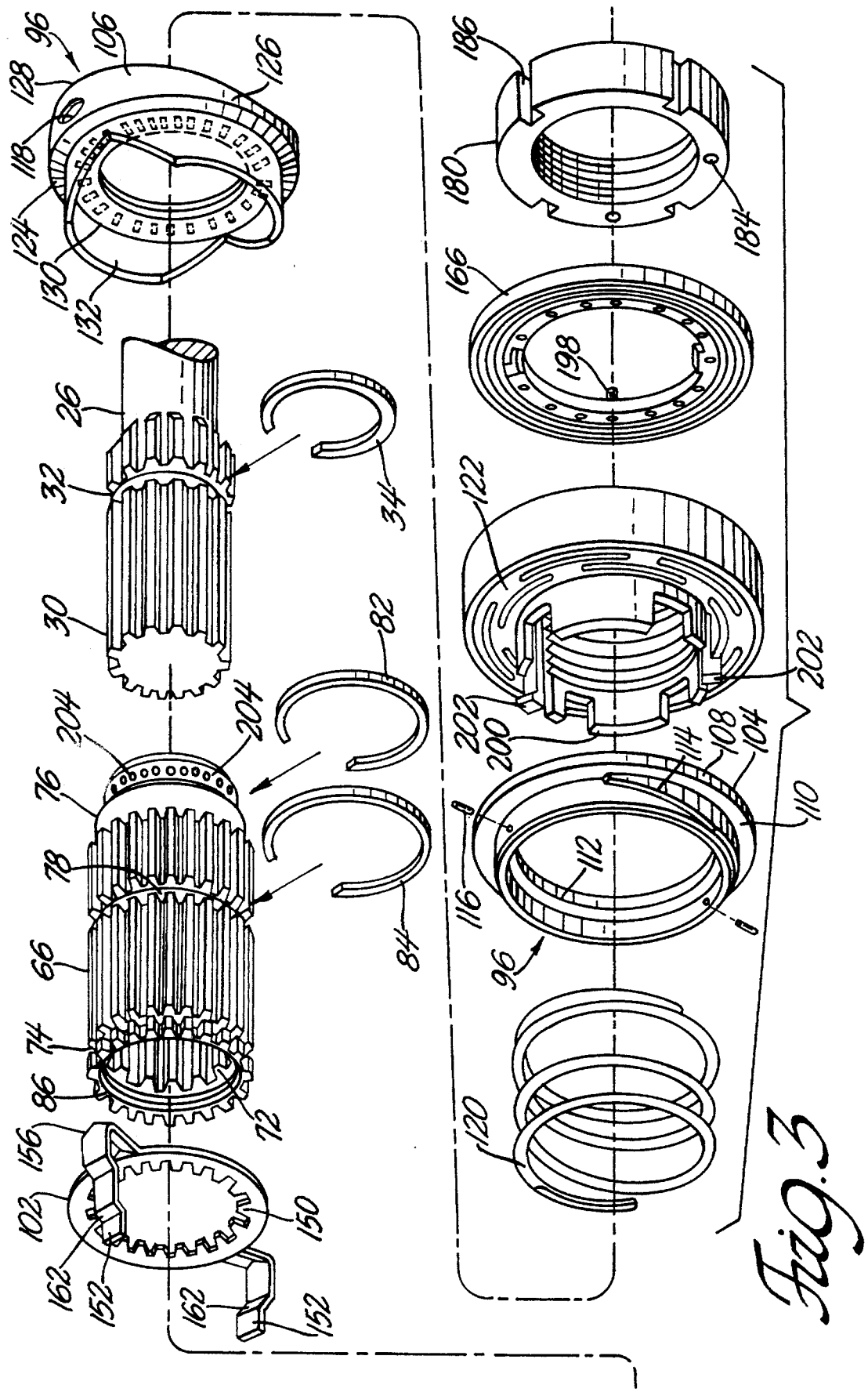
Figure 4:
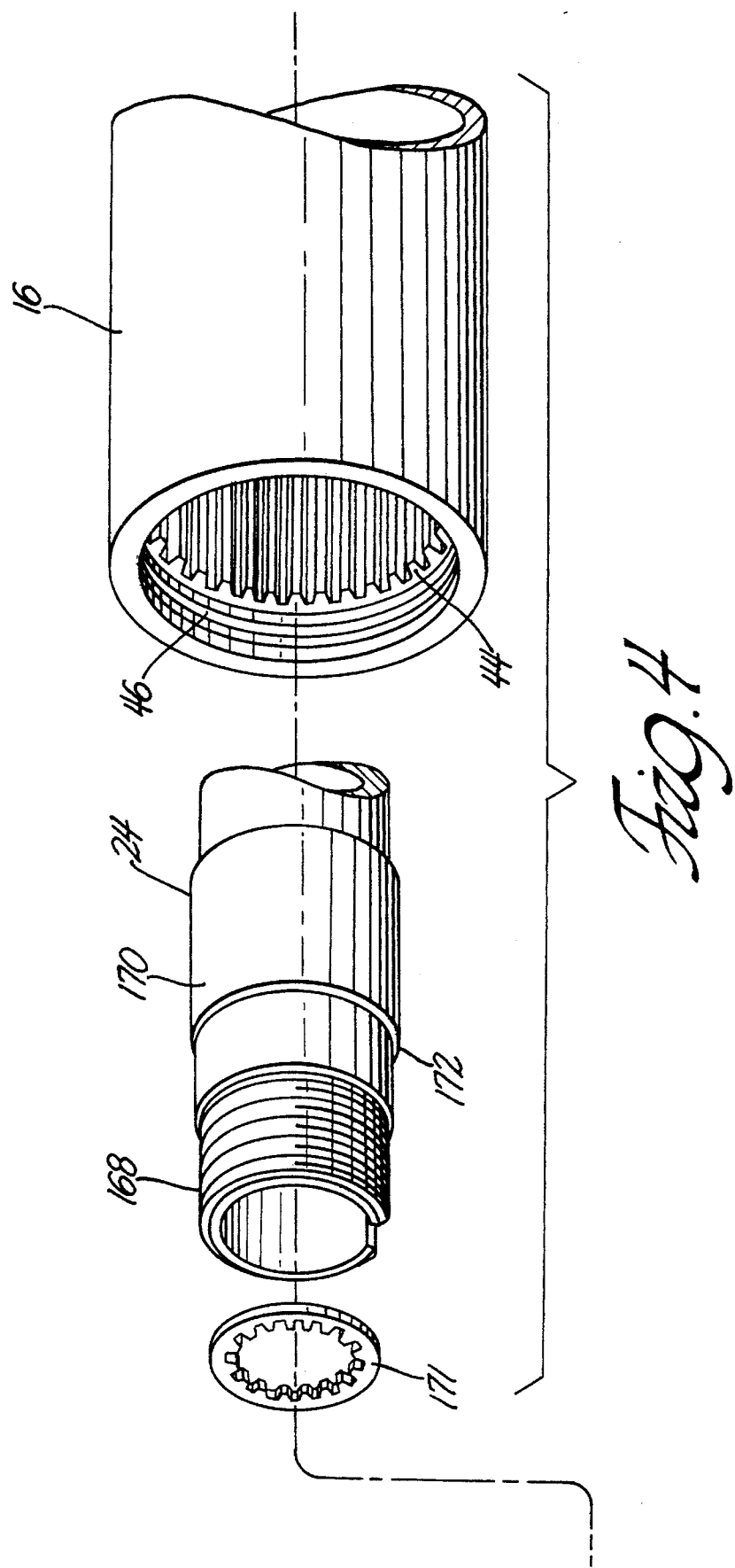

Referring now to FIG. 1, there is generally shown a wheel assembly 10 of a vehicle, which in one preferred form of the present invention is the front wheel assembly of a four-wheel drive vehicle. As shown, the wheel assembly 10 broadly includes a tire 12 mounted on a wheel 14 which is fastened to a rotor or wheel hub 16 of a locking hub assembly 18 having forward and rearward radial flanges 20 and 22. It will be appreciated that the terms "rotor" and "wheel hub" are equivalent terms and may be used interchangeably, however, for clarity and conciseness only the term rotor shall be used from this point forward. Extending rearward from the back of the rotor 16 of the locking hub assembly 18 is a tubular spindle 24 and axle 26 having a central axis 28 concentric with a central axis of the wheel 14, tire 12 and rotor 16. As shown in FIG. 3, the axle 26 is a solid cylindrical member having a plurality of external circumferentially spaced splines 30 extending longitudinally rearward from a forward end of the axle. Spaced from the forward end of the axle is a slot 32 encircling the external diameter of the axle for receiving a retaining ring 34. The thickness of the retaining ring 34 may be greater than the depth of the slot 32. The wheel 14 is attached to the forward flange 20 of the rotor 16 by threaded fasteners 36 extending through openings formed within the forward flange 20. Similarly, a brake disc 38 is attached by threaded fasteners 36 extending through openings formed within the rearward flange 22 of the rotor 16.

The locking hub assembly 18 of FIGS. 2–10 broadly includes a first rotatable assembly, a second rotatable assembly having an axially movable rotating member, a means for moving the rotating member axially between a first position and a second position and a nonrotatable electromagnetic means fixed for nonrotation about the axis 26 for activating the axially moving means.

As used herein "first position" refers to the arrangement of the locking hub assembly 18 wherein the first rotatable assembly operatively engages the second rotatable assembly and, similarly, the "second position" refers to the arrangement of the locking hub assembly wherein the first rotatable assembly is disengaged from the second rotatable assembly.

As shown in FIGS. 2–10, the first rotatable assembly of the locking hub assembly 18 includes a rotor 16, outer clutch housing 40 and cap 42. The rotor 16 is of a generally a tubular shape having a plurality of internal splines 44 spaced about the inner circumference thereof extending longitudinally rearward from a forward end of the rotor. Formed within the inner forward end of the rotor 16 is a circumferential retaining groove 46 which in cooperation with a retaining ring 48 and an opposing external circumferential retaining groove 50 of the outer clutch housing 40 maintains the axial position of the rotor with respect to the outer clutch housing.

The outer clutch housing 40 is positioned concentrically within the rotor 16 and is of a tubular shape having internal forward spaced radially inward circumferential teeth 52 and external radially outwardly directed spaced circumferential splines 54 which intermesh with the inner splines 44 of the rotor. The retaining ring 48 having angular ends 56 is positioned within the external retaining groove 50 about the outer circumference of the outer clutch housing 40. In the expanded condition, the retaining ring 48 restricts the axial movement of the outer clutch housing 40 relative to the rotor 16. However, for ease of installation, a second rearward o-ring 58 may be positioned within a groove 60 to secure a retaining clip 62 over the angular ends 56 of the retaining ring 48 to compress the retaining ring within the retaining groove 50 prior to installation of the locking hub assembly 18. During installation of the outer clutch housing 40 within the rotor 16, the retaining clip 62 moves axially forward thereby releasing the retaining ring 48 from the retaining clip such that the retaining ring expands outwardly within the external retaining groove 50 providing an interference fit between the retaining ring and internal retaining groove 46 and external retaining groove 50.

A cap 42 having a cylindrical cup like shape may be secured by threaded fasteners 64 within threaded holes formed within the forward end of the outer clutch housing 40. The cap 42 overlaps the outer clutch housing 40 and abuts against the rotor 16 thereby sealing the forward open end of the rotor.

Positioned concentrically within the first rotatable assembly is the second rotatable assembly. As shown in FIG. 2–10, the second rotatable assembly include a hub sleeve 66 and axially movable rotating member 68.

The hub sleeve 66 surrounds a portion of the axle 26 forward of the axle retaining ring 34. The hub sleeve 66 is a tubular member having external spaced circumferential splines 70 and internal spaced circumferential splines 72 which intermesh with the external axle splines 30. Forward groove 74, rearward groove 76 and intermediate groove 78 are formed transverse to the longitudinal splines 70 within the external circumferential surface of the hub sleeve 66 to receive spring retainer clip 80, thrust washer 82 and intermediate retaining ring 84, respectively. The thickness of the spring retainer clip 80, thrust washer 82 and intermediate retaining ring 84 may be greater than the depth of the respective grooves. Formed within the interior forward end of the hub sleeve 66 is a concave recess 86 which serves as a supporting surface for a bearing ring 88.

Surrounding the hub sleeve 66 is an axially movable rotating member 68, FIGS. 2–10. The axially movable rotating member 68 is a clutch gear or the like. The rotating member 68 includes a tubular member having a radially extending rim 90 including circumferentially spaced radially outwardly extending teeth 92. Formed about the circumference of the interior of the cylindrical member of the rotating member 68 are splines 94 which engage the splines 72 of the hub sleeve 66.

Referring to FIG. 2–10, a means for moving the rotating member 68 between a first position and a second position is shown. The moving means includes a cam assembly 96, an engaging spring 98, a return assembly 100 and an axially movable cam follower 102.

The cam assembly 96 acts as a reaction surface for the cam follower 102 to actuate the axial movement of the cam follower. As shown in FIGS. 2–5, the cam assembly 96 includes a clutch plate 104, reaction hub 106 and cam ramp 107 freely rotatable concentrically with respect to the axle 26. Although it is preferred that the clutch plate 104, reaction hub 106 and cam ramp 107 are formed as separate elements for greater tolerance control in assembly and manufacture, it will be appreciated that the clutch plate and/or reaction hub and/or cam ramp may be formed as one or two elements and perform equally as well.

Figure 5:
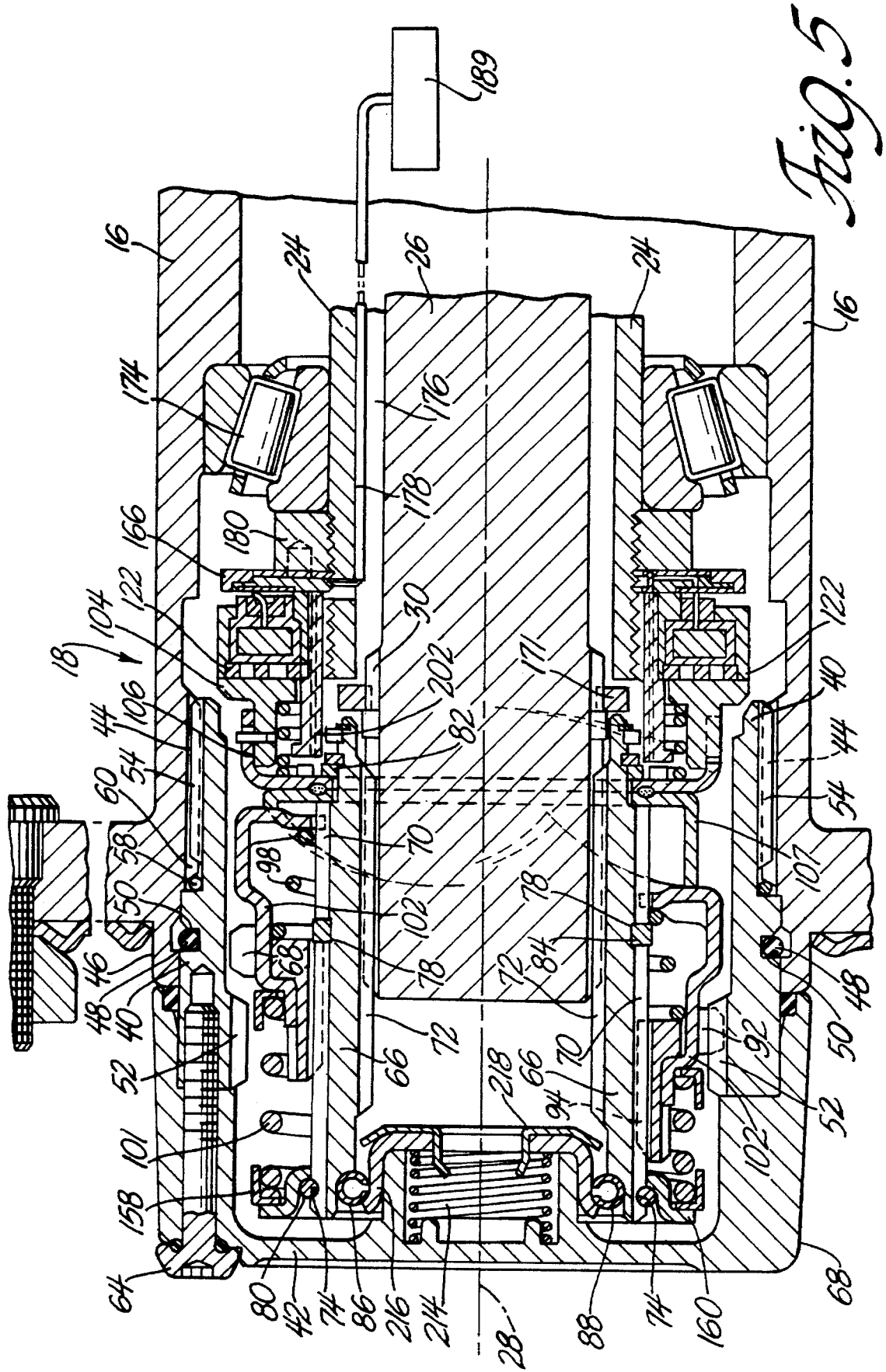
FIG. 5 is a cross sectional view of an assembled automatic locking hub of the type shown in FIGS. 2–4 wherein the upper half demonstrates the assembly in the disengaged position and the lower half demonstrates the assembly in the engaged position.

In a preferred embodiment of the cam assembly as shown in FIGS. 3 and 5, the clutch plate 104 is positioned adjacent a vertical forward face of an electromagnetic coil 122 and is of a generally tubular shape including a rearward flange 108 defining an outer annular shoulder surface 110 and an inner annular shoulder surface 112. The outer annular shoulder surface 110 is contoured to include opposing ramp surfaces 114 for variable surface contact with a matching reaction hub 106. One or more cylindrical retaining pins 116 may extend transversely from the external cylindrical surface of the clutch plate 104 through an elongated slot 118 formed within the side surface of the reaction hub 106 to assist in ease of assembly and transport of the component parts prior to assembly in a vehicle. A helical preload spring 120 is biased between the clutch plate 104 and reaction hub 106 to maintain the clutch plate 104 adjacent the electromagnetic coil 122, more fully described herein, thereby preventing excessive gap between the electromagnetic coil and clutch plate.

Positioned forward of the clutch plate 104 is the reaction hub 106. The reaction hub 106 is a generally rearwardly directed cam having a bottom disc 124 and projecting integral tubular side 126 having a scalloped rim 128. The scalloped rim engages the matching ramp surfaces 114 of the clutch plate 104 so that the clutch plate 104 and reaction hub 106 increase the torque capacity of an electromagnetic clutch that stops rotation of the clutch plate 104 as explained below. It will be appreciated that the reaction hub 106 allows for freedom of motion of the rotor 16 and reduces the necessity for positional tolerance control of the cam ramp 107 and cam follower 102.

Securely fastened to the back surface of the bottom disc 124, which is transverse to the axis of the reaction hub 106, is the cam ramp 107. The cam ramp 107 is a forwardly directed cam having a bottom disc 130 and projecting tubular side 132 having a contoured outer rim 134. The outer rim 134 of the cam ramp 107 has formed therein at least one, and preferably two diametrically opposing V-shape notches 136 to provide a variable reaction surface consisting of at least one low height edge portion and at least one high height edge portion for the cam follower 102. In a preferred embodiment, the back surface of the bottom disc 124 of the reaction hub 106 and the back surface of the bottom disc 130 of the cam ramp 107 are securely fastened to one another by weldment or the like and rotate about a pilot diameter of the hub sleeve 66 between the thrust washer 82 and retaining ring 84 secured within grooves 76 and 78 of the hub sleeve 66 and rearward end of splines 70 of the hub sleeve. The thrust washer 82 acts to absorb the force resulting from the axial movement of the cam ramp 107.

Figure 6:
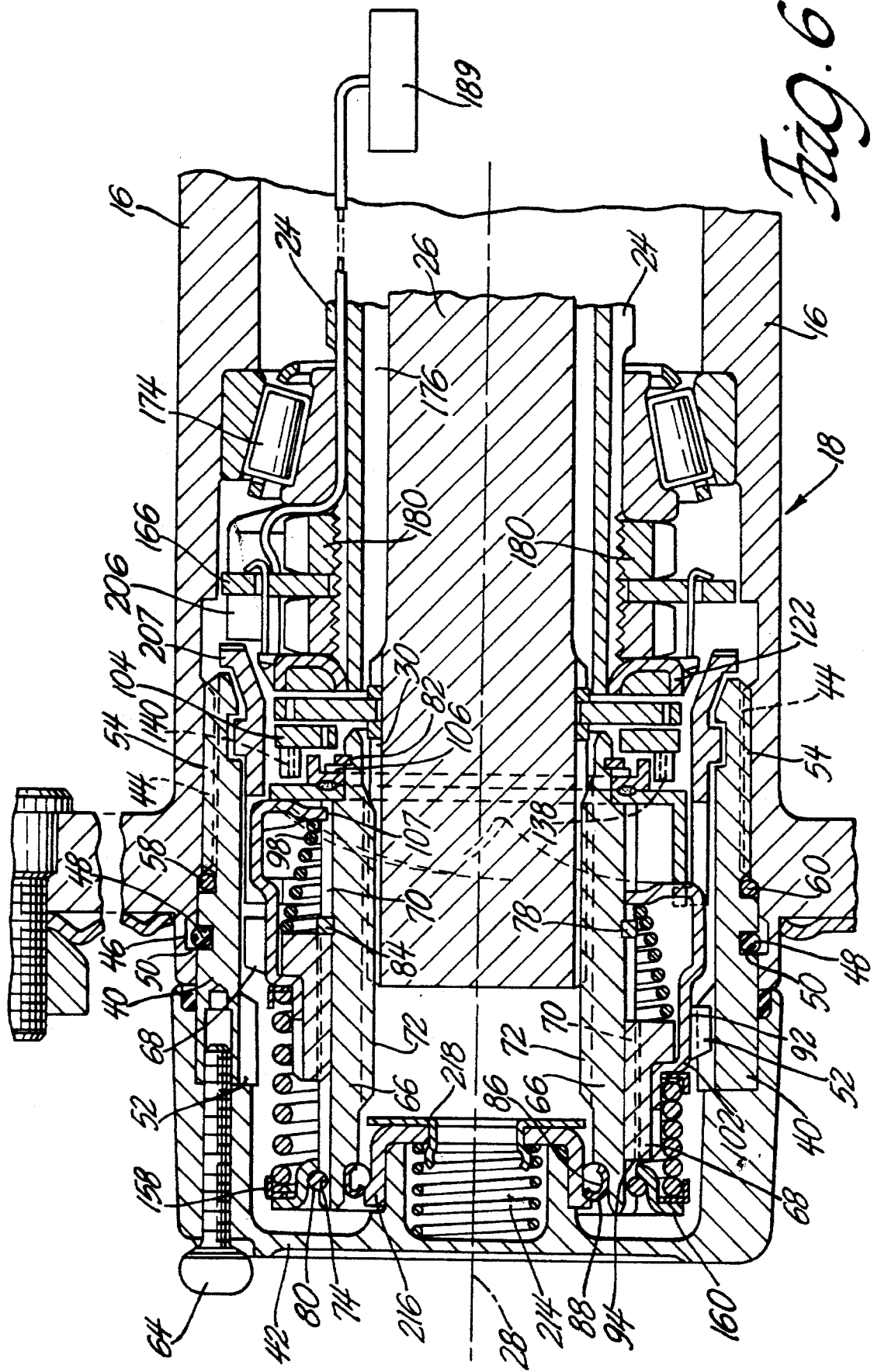
FIGS. 6–9 are cross sectional views of assembled automatic locking hubs in accordance with various alternative embodiments of the present invention wherein the upper half of each view demonstrates the assembly in the disengaged position and the lower half demonstrates the assembly in the engaged position.

Now referring to FIGS. 6–10, various additional alternative configurations of a clutch plate 104 and reaction hub 106 are shown. As shown in FIG. 6, the clutch plate 104 includes a disc like member having in integral tubular projection including a plurality of spaced radially inwardly directed splines 138. The opposing reaction hub 106 includes a disc like member having an integral projecting tubular side including a plurality of spaced outwardly directed circumferential splines 140 which intermesh with the inwardly directed splines 138 of the clutch plate 104. Secured to the back surface of the reaction hub 106 is the cam ramp 107 as shown in FIG. 3.

Figure 7:
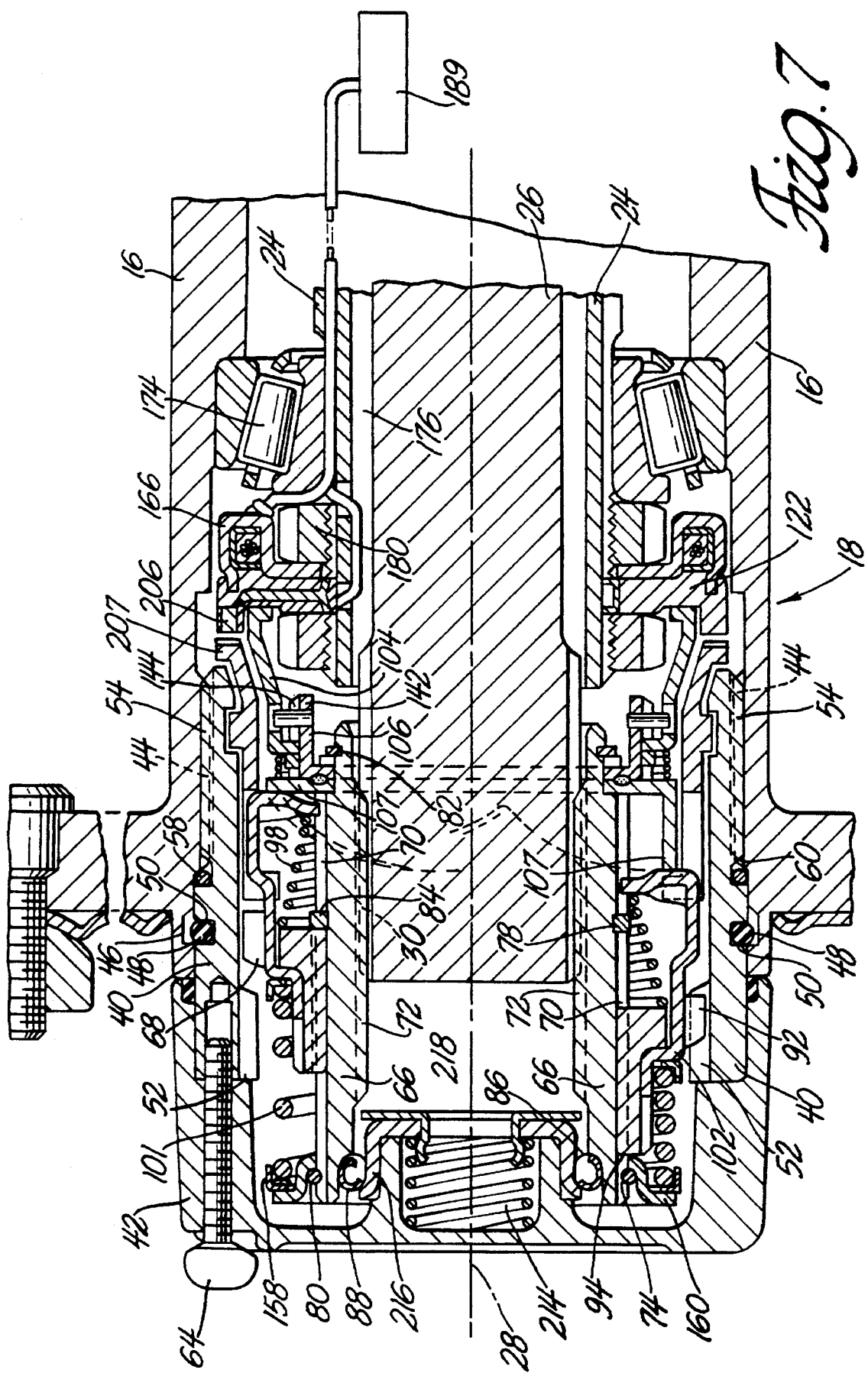

The clutch plate 104 of FIG. 7 is a general frustoconical member having a tubular front portion and rearward rim for structural support. The tubular front portion includes a plurality of spaced radially inwardly directed circumferential splines 142. The opposing reaction hub 106 includes a disc like member having an integral projecting tubular side including a plurality of spaced outwardly directed circumferential splines 144 which intermesh with the radially inwardly directed splines 142 of the clutch plate 104. The cam ramp 107 as shown in FIG. 3 is also secured to the back surface of the reaction hub 106.

Figure 8:
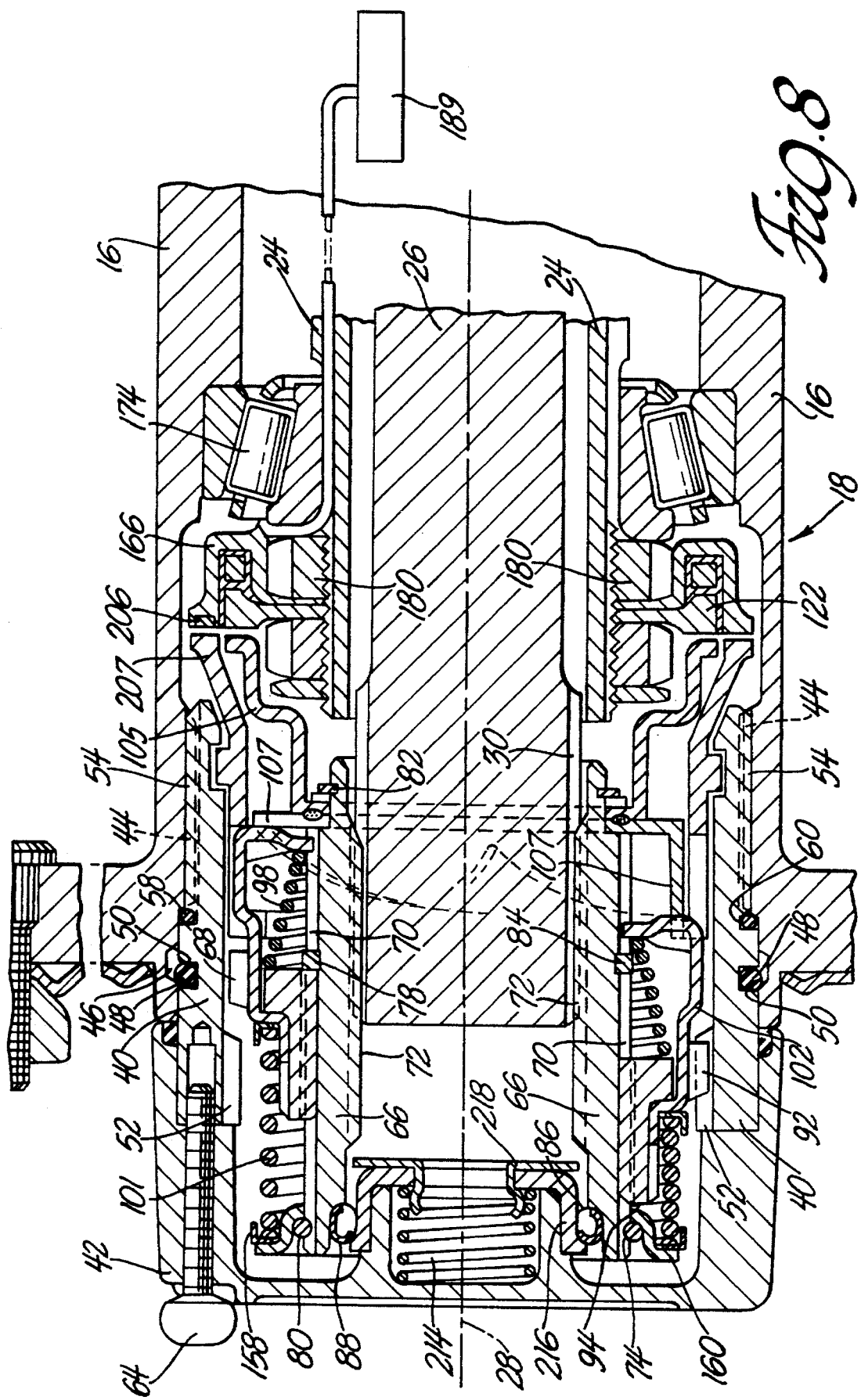

In yet another embodiment as shown in FIG. 8, the clutch plate 104 and reaction hub 106 may be formed as one element having a general form of a stepped frustoconical member 105. A cam ramp 107 as shown in FIG. 3 is secured to the back surface of the stepped frustoconical member 105.

Figure 9:
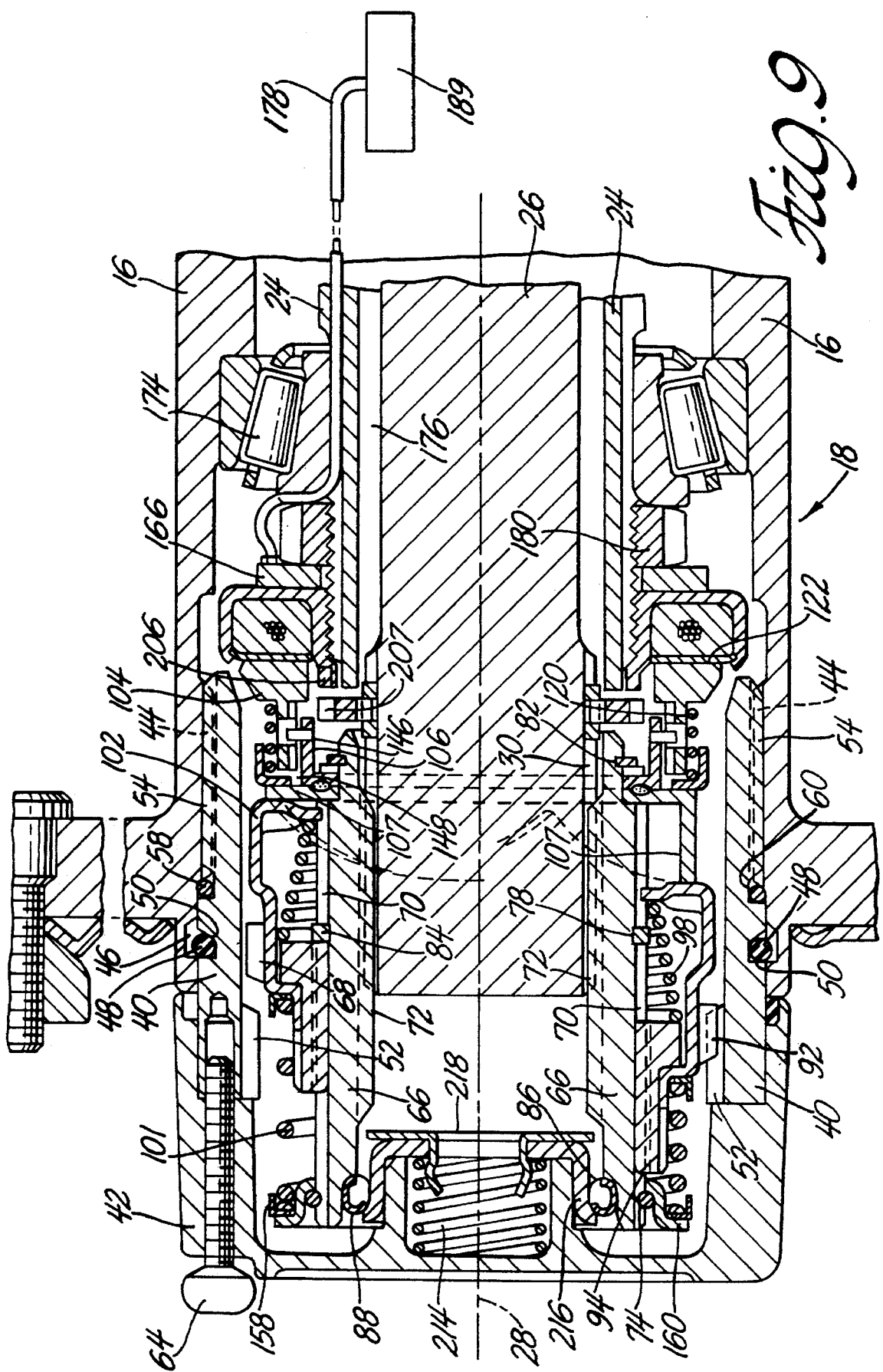

As shown in FIG. 9, the clutch plate 104 includes a frustoconical member including a projecting tubular member having a plurality of spaced circumferential inwardly directed splines 146. The reaction hub 106 is a disc member having an integral projecting tubular member including a plurality of spaced circumferential outwardly directed splines 148 which intermesh with the splines 146 of the clutch plate 104. Interposed between the clutch plate 104 and reaction hub 106 is a spring 120 for biasing the clutch plate against the electromagnetic coil 122. Secured to the back surface of the clutch plate 104 is the cam ramp 107 as shown in FIG. 3.

Referring to FIGS. 3 and 5–10, positioned forward of the cam ramp 107 between the cam ramp and intermediate retaining ring of the hub sleeve 66 is a cam follower 102. The cam follower 102 includes a disc member having interior teeth 150 extending radially inwardly for meshing engagement with the splines 70 of the hub sleeve 66. Two prong members 152 extend radially outwardly and forwardly from the external edge of the disc member of the cam follower 102. The prong members 152 are stepped inwardly toward the axle 26 and extend longitudinally over diametrically opposed flats 154 formed between the gear teeth 92 of the rim 90 of the rotating member 68 and the external circumferential surface of the cylindrical member of the rotating member. The radially inwardly extending teeth 150 of the cam follower 102 and inner circumferentially spaced splines 94 of the rotating member 68 intermesh with external circumferentially spaced longitudinal splines 70 of the hub sleeve 66 to provide axial guidance to the rotating member 68 and cam follower 102 and, in the engaged position, transmit rotary motion and/or torque from the axle 26 to the outer clutch housing 40.

Figure 11:
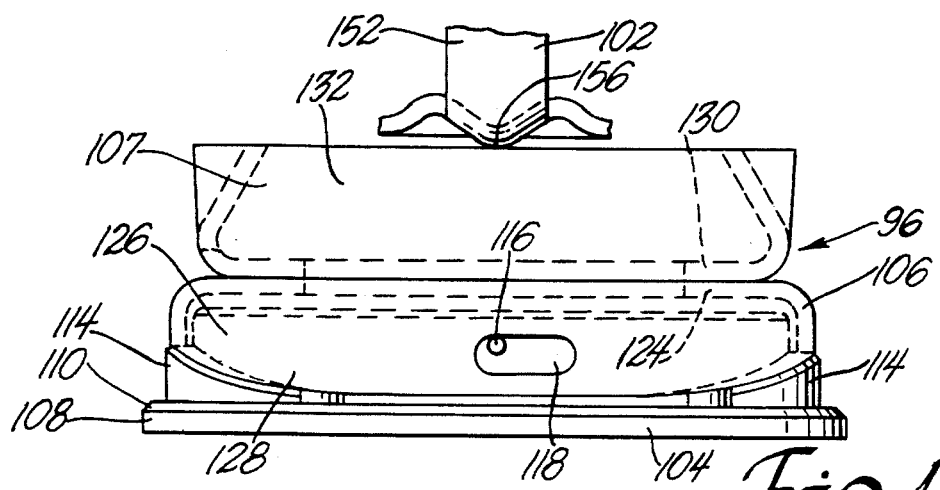
FIG. 11 is an enlarged partial view of the clutch plate, reaction hub, cam ramp and cam follower of FIG. 5 in the engaged position.
Figure 12:
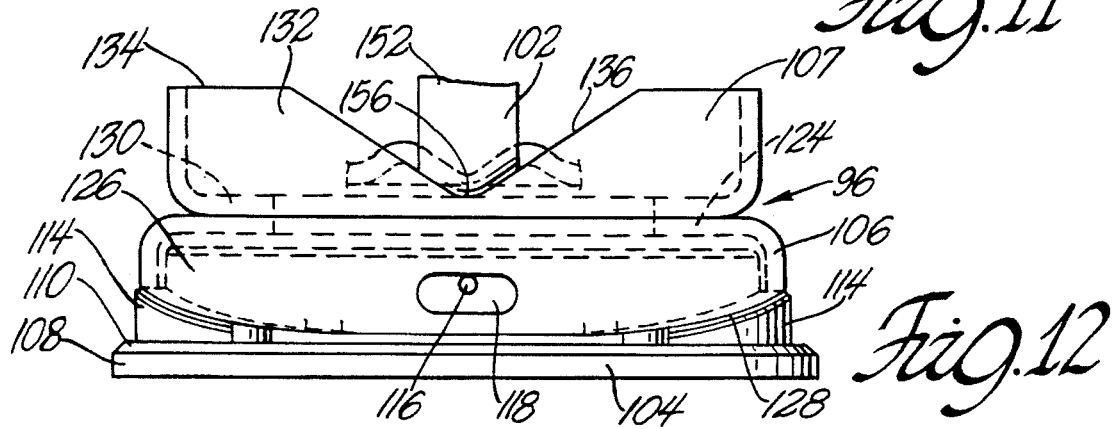
FIG. 12 is an enlarged partial view of the clutch plate, reaction hub, cam ramp and cam follower of FIG. 5 in the disengaged position.

As shown in FIGS. 3, 11 and 12, an optional detent 156 may be provided at the top of the prong member 152 of the cam follower 102 to position the cam follower relative to the cam ramp 107 and act as a sliding ramping surface to accommodate a complimentary notched cam ramp surface.

The engaging spring 98 and the return assembly 100 are positioned for yieldably biasing the rotating member 68 between the first position and the second position. As shown in FIGS. 2 and 5–10, the engaging spring 98 is positioned between the cam follower 102 and rotating member 68. The engaging spring 98 provides axial forward force to the rotating member 68 as a return spring 101 of the return assembly 100 is compressed by the cam follower 102 as further described herein. Surrounding the cylindrical member of the rotating member 68 is the return assembly 100. The return assembly 100 includes a helical return spring 101 contained between opposing spring retainer rings 158. Positioned forward of the return assembly 100 is a spring support washer 160 and spring retainer clip 80. The spring retainer clip 80 is secured within a forward groove 74 of the hub sleeve 66 to restrict the forward axial movement of the return assembly 100 and rotating member 68 on the hub sleeve 66. In a preferred embodiment, the return spring 101 force is greater than the opposing force of the engaging spring 98.

As shown in FIGS. 2–10, the prong members 152 of the cam follower 102 extend over the rim 90 between the rotating member gear teeth 92 within flats 154 such that during locking hub assembly engagement, surface 162 compresses the return spring 101 positioned within the spring retainer rings 158 between the spring support washer 160 and surface 162 of the prong members 152 of the cam follower 102.

Fixed for nonrotation about the axle 26 is an electromagnetic means for activating the moving means. The electromagnetic activating means includes an electromagnetic coil 122 and power washer 166 secured to a spindle 24 fixed for nonrotation about the axle 26. The spindle 24 is a hollow cylinder positioned concentrically between the rotor 16 and axle 26 and axially rearward of the hub sleeve 66. A spacer washer 171 includes radially inwardly extending teeth which engage with the splines 30 of the axle 26 and protect the rearward hub sleeve 66 end and forward end of the spindle 24. The exterior of the spindle 24 includes a threaded forward end 168 and enlarged diameter portion 170 separated by step 172. As shown in FIGS. 5–10, mounted between the external surface of the spindle 24 and the internal surface of the rotor 16 are bearings 174 which support the rotor 16 such that the axle 26 and rotor rotate freely with respect to the spindle 24.

Threaded on the forward end 168 of the spindle 24 is a retaining member 180 through which the electromagnetic activating means is secured for nonrotation about the axle 26. As shown in FIGS. 3, 5–10, the retaining member 180 includes at least one cylindrical retaining nut threaded on one or both sides of the electromagnetic coil 122 for retaining the electromagnetic coil. The retaining member 180 includes one or more circumferentially spaced bores 184 formed within the front surface of the retaining member. Slots 186 may be formed parallel to the central axis about the periphery of the retaining member 180 to assist in torquing the threaded retaining member on the threaded spindle 24.

An annular passage 176 may be formed between the spindle 24 and axle 26 and functions as a channel for a wire 178, cable, fibre-optic and the like to provide electrical power and a signal to activate the locking hub assembly 18 as more fully described herein. It will be appreciated that the annular passage 176 may also function as a conduit for assembling bearings, nuts, and other coaxial elements over the wire, cable or fibre-optic. In a preferred embodiment, electrical power and/or signal are conveyed through a wire 178 to a connector block 188 (FIGS. 14–16) of the power washer 166 and connected to a signal processor 189, FIGS. 3, 5, 13–16. As shown in FIGS. 13–16, the power washer 166 is a disc-like member including a plurality of insulator rings 190 which separate the powered washer into an inner retaining ring 192, sensor conductor rings 194 and electromagnetic coil conductor rings 196. One or more pins 198, circumferentially spaced about the periphery of the retaining ring 192, extend through the power washer 166 such that the pins in cooperation with bores 184 of the retaining member 180 secure the power washer to the retaining member. It will be appreciated that the power washer 166 may also be fastened to the retaining member 180 through most any suitable means such as by threaded fasteners, weldment, adhesive and the like.

Threaded on the spindle 24 forward of the power washer 166 is an electromagnetic coil 122 having a threaded interior bore. The electromagnetic coil 122 is generally of an annular shape consisting of encapsulated interior windings of wire. In a preferred embodiment as shown in FIGS. 3 and 5, a collar 200 projects axially from the forward face of the electromagnetic coil 122 to assist in the torquing of the threaded electromagnetic coil onto the external spindle threads.

To determine the relative position of the second rotatable assembly and the moving means with respect to the electromagnetic means detection sensors may be utilized. Suitable detection sensors include Hall sensors 202 in combination with magnets 204 and/or proximity switches 206 in combination with position markers 207.

As shown in FIG. 3, the magnets 204 may be secured to the hub sleeve 66 and the reaction hub 105 and the Hall sensors 202 may be formed with or secured to the end of the collar 200 or the end of the spindle 24. The magnets 204 and the Hall sensors 202 cooperatively produce a fluctuating signal as a result of the sensor magnetic field being interrupted by the magnets as the magnets rotate about the axis 28. As shown in FIG. 3, magnets 204 of the hub sleeve 66 rotate with the axle 26 and magnets 204 of the reaction hub 106 rotate about the axle to assist in determining the relative rotation between two separately rotating assemblies and the magnetic coil 122. The fluctuating signal is then conveyed to a signal processor 189 whereby the relative angular displacement of each rotating part is calculated to determine whether locking hub assembly 18 is in the first position or in the second position.

In yet another embodiment as shown in FIG. 9, a position marker 207 such as a washer or other cylindrical member containing one or more equally spaced circumferential slots or apertures is mounted on the axle 26 adjacent to the proximity switch 206 mounted on the spindle 24. It will be appreciated that the proximity switch 206 may also be positioned above the electromagnetic coil 122 and/or adjacent a frustoconical cylindrical drum, FIGS. 6, 7, 8 and 10. It will also be appreciated that the embodiment of FIGS. 6, 7, 8, 9 and 10 require position markers and proximity switches to replace the magnets 204 secured to the cam assembly and its associated Hall sensor 204 in the embodiment of FIGS. 1 to 5. Power may be supplied to the Hall sensors 202 and/or proximity switches 206 through wire 178 or sliding contact with the appropriate annular ring 194 of the power washer 166.

Biased between the cap 42 and hub sleeve 66 is an axial bearing support assembly 212. The axial bearing support assembly 212 includes a bearing race spring 214, a bearing collar 216, bearing clip 218 and a bearing ring 88 of substantially the same diameter as the internal diameter of the hub sleeve 66. The bearing ring 88 slides over the exterior of the cylindrical bearing collar 216 and is secured thereto by bearing clip tabs which are flexibly engaged within an aperture of the bearing collar. The bearing race spring 214 is positioned within a notch 222 within the cap 42 against the bearing collar 216 to maintain the axial bearing support assembly 212 adjacent the hub sleeve 66 thereby rotatably supporting the forward end of the hub sleeve.

To operatively engage the rotor 16, an electric signal from a signal processor 189 energizes through wire 178 the electromagnetic coil 122 via the powered washer 166. The electromagnetic coil 122 and clutch plate 104 comprise an electromagnetic clutch or brake. Magnetic attraction generated by the electromagnetic coil 122 fixes the clutch plate 104 of the cam assembly 96 to the electromagnetic coil thereby locking the cam assembly in a fixed position as the axle 26, hub sleeve 66, rotating member 68 and cam follower 102 rotate. As the cam follower 102 rotates about the axle 26, the prong members 152 move from the V-shaped notches 136 to a high height edge portion along the contoured edge surface of the cam ramp 107 of the cam assembly 96 thereby driving the cam follower 102 axially forward. As the cam follower 102 moves axially forward, the return spring 101 is compressed thereby removing the rearwardly acting pressure of the return spring and allowing the engaging spring 98 to force the rotating member 68 axially forward into meshing engagement with the teeth 52 of the outer clutch housing 40 to connect the axle 26 to the rotor 16 such that the automatic locking hub assembly is in the first position.

Movement of the prong members 152 up the ramp of the V-shaped notches 136 to the high height edge portion from the position shown in FIG. 11 to the position shown in FIG. 12 also tends to rotate the reaction hub 106 in the same direction as the cam follower 102. However any slight rotation spreads the reaction hub 106 and the clutch plate 104 apart due to the interaction of the scalloped rim 128 of the reaction hub 106 and the ramp surfaces 114 of the clutch plate 104. This spreading action presses the clutch plate 104 against the electromagnetic coil 122 and increases the holding power or torque capacity of the electromagnetic clutch responsive to the operational mode change.

As the cam follower 102 rotates and moves axially forward the magnets 204 secured to the hub sleeve 66 (or the position marker 207) also rotate relative to the magnets 204 secured to the reaction hub 106 (or a position marker secured to the cam assembly). The Hall sensors 202 (or proximity switches) generate signals for the signal processor 189 that are used to determine the relative angular displacement of the cam follower with respect to the cam assembly. When the displacement reaches a predetermined number of degrees that indicates that the cam follower 102 is correctly positioned for rotating member 68 to engage clutch housing 40 under the action of engaging spring 98 the signal processor 189 interrupts the electric current to the electromagnetic coil 122. The electromagnetic coil 122 is deenergized such that the magnetic field collapses allowing the clutch plate 104 and cam ramp 107 of the cam assembly 96 to rotate free of the electromagnetic coil 122.

To disengage the locking hub assembly 18 from the first position, an electrical signal from the signal processor 189 reenergizes the electromagnetic coil 122 thereby preventing the clutch plate 104, reaction hub 106 and cam ramp 107 of the cam assembly 96 from rotating. The rotating cam follower 102 moves from the high height edge portion of the contoured edge surface of the cam ramp 107 of the cam assembly 96 to the low height edge portion of the V-shaped notches 136 of the cam ramp 107 of the cam assembly thereby moving the rotating cam follower axially rearward. As the cam follower 102 moves axially rearward, the return spring 101 pushes the rotating member 68 out of engagement with the outer clutch housing and compresses the engaging spring 98 between the rotating member 68 and the cam follower 102. After the Hall sensor 303 and/or proximity switch 206 sense that the first rotatable assembly has rotated a predetermined number of degrees, the signal processor 189 interrupts electric current to the electromagnetic coil 122 thereby releasing the clutch plate 104, reaction hub 106 and cam ramp 107 of the cam assembly 96 to freely rotate in synchronization with the cam follower 102. The rotor 16 and the locking hub assembly 18 are now disengaged and in the second position.

Although the operation of the locking hub assembly 18 has been described in detail with respect to the embodiment of the present invention as shown in FIGS. 2–5, it will be readily apparent to one skilled in the art that the same principle of operation is applicable to the various embodiments of the present invention as shown in FIGS. 6–10.

Figure 10:
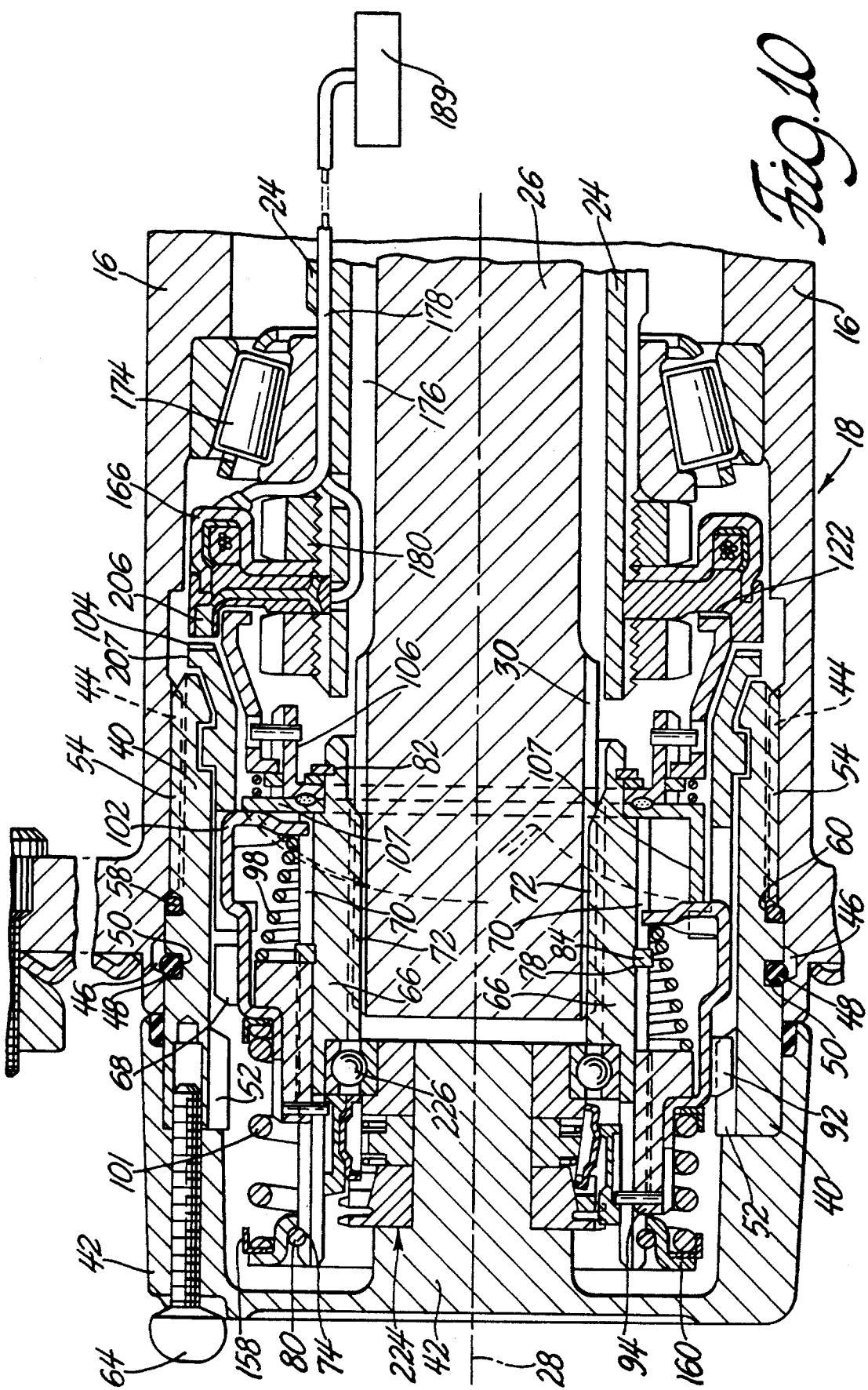
FIG. 10 is a cross sectional view of the assembled automatic locking hub of FIG. 7 including a synchronizer assembly.
Figure 13:
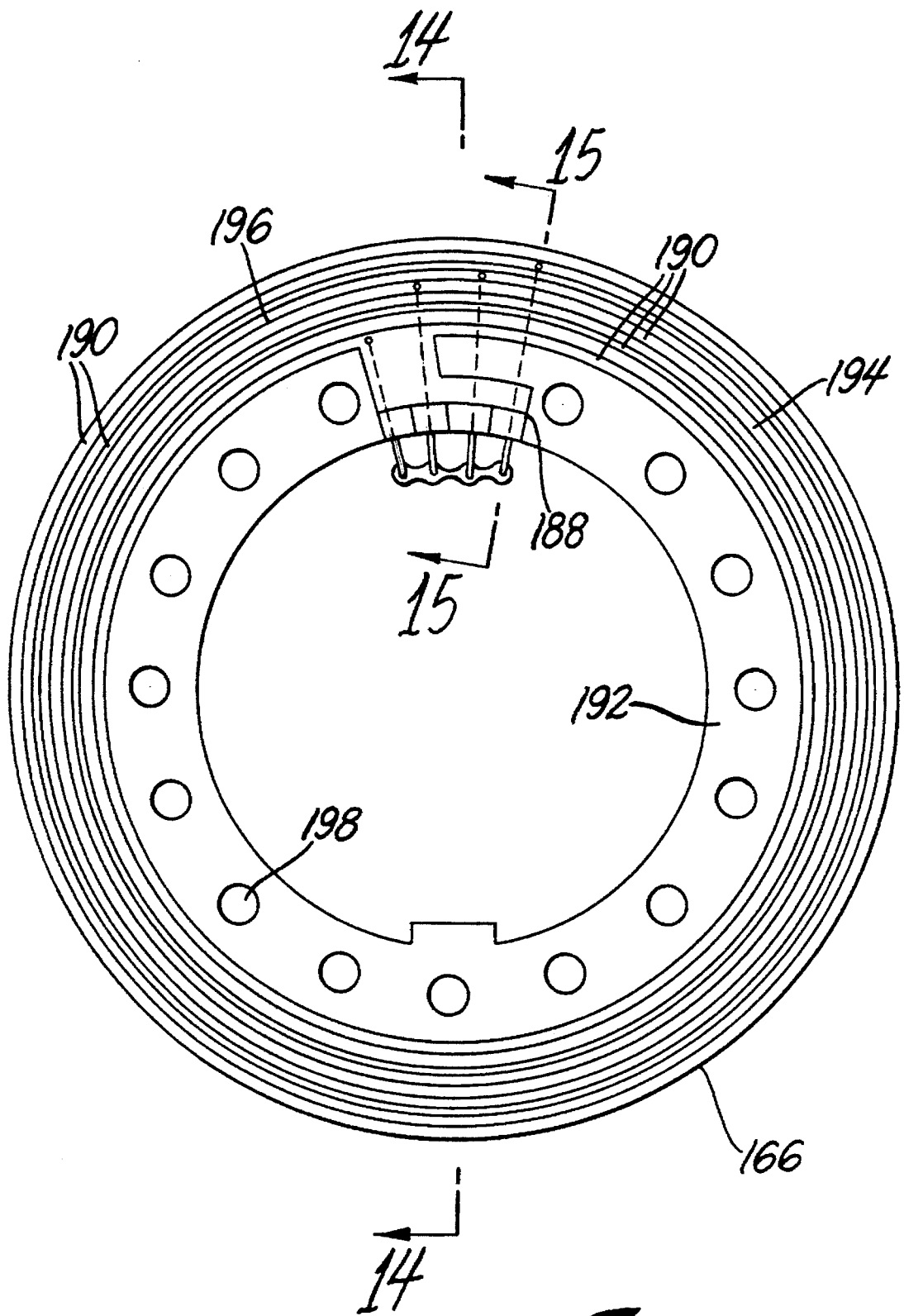
FIG. 13 is an enlarged front view of the powered washer of FIG. 5.
Figure 17:
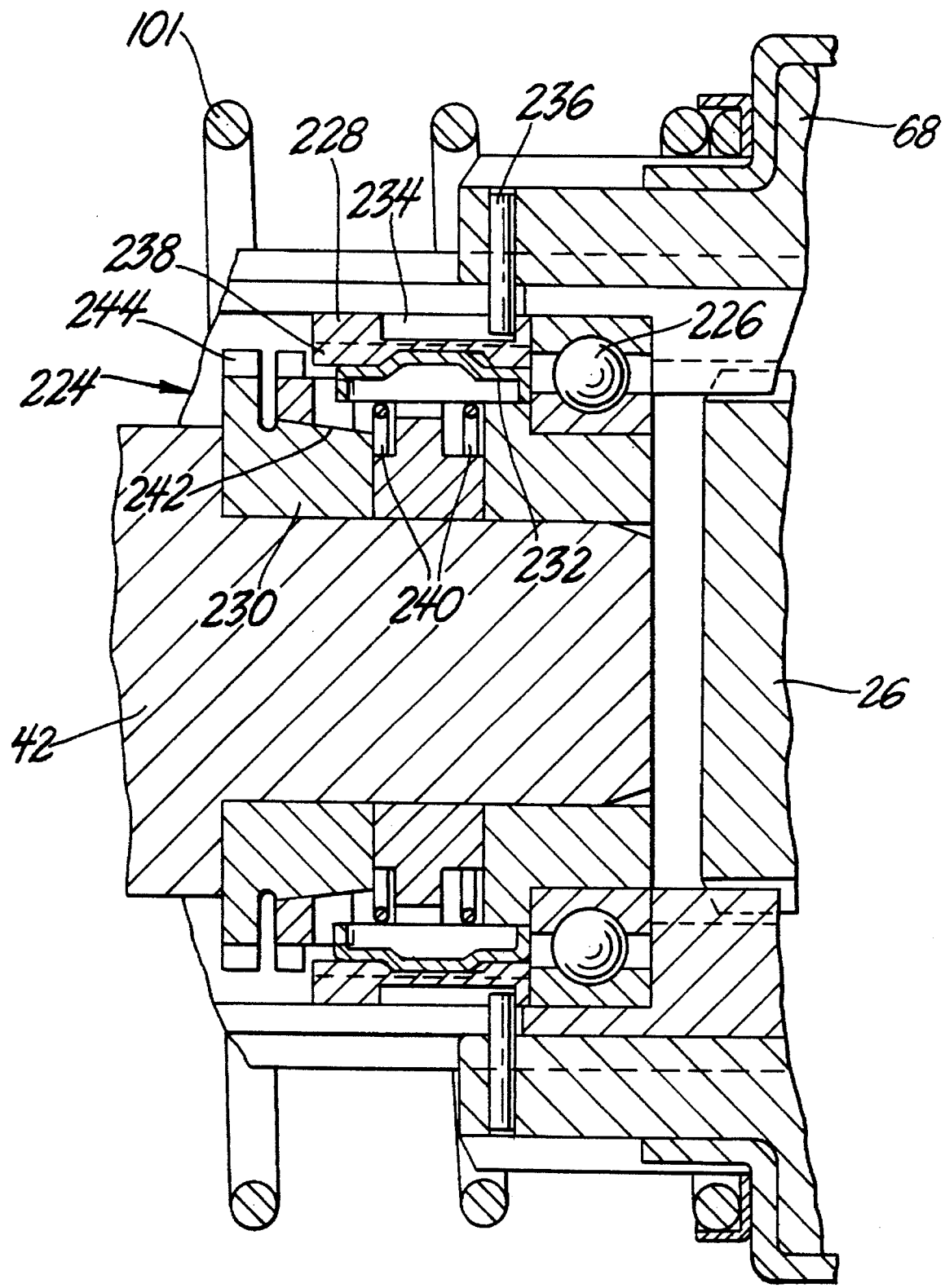
FIG. 17 is an enlarged partial view of the locking hub assembly and synchronizer assembly of FIG. 10.
Figure 18:
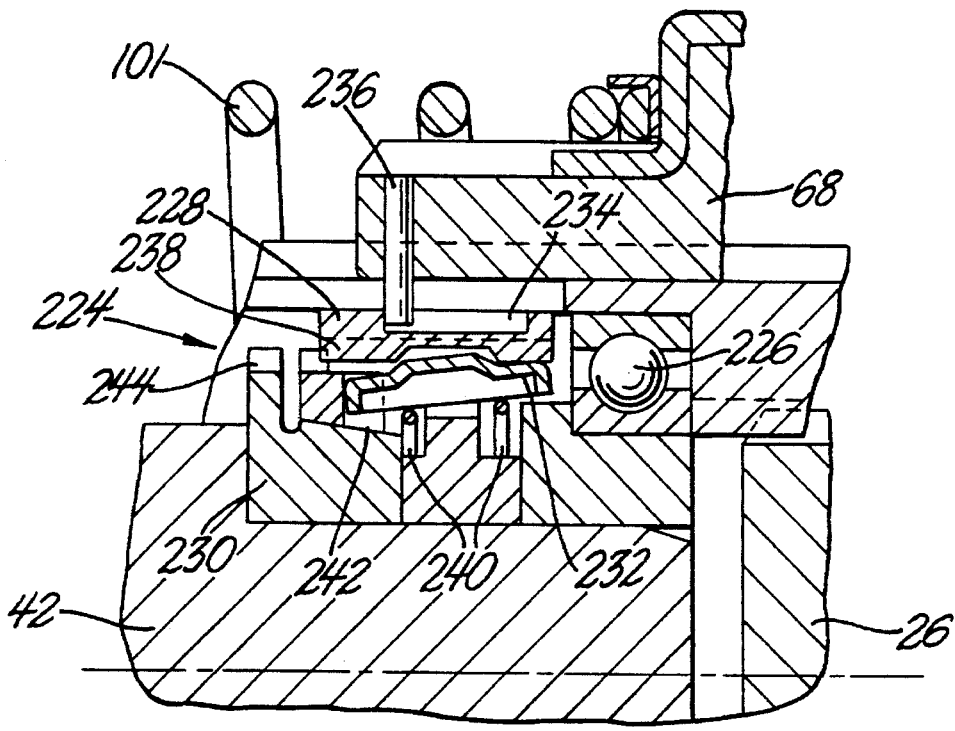
FIG. 18 is an enlarged view of the top half of the locking hub assembly and synchronizer assembly of FIG. 17 illustrating the synchronizer assembly in partially engaged position.
Figure 19:
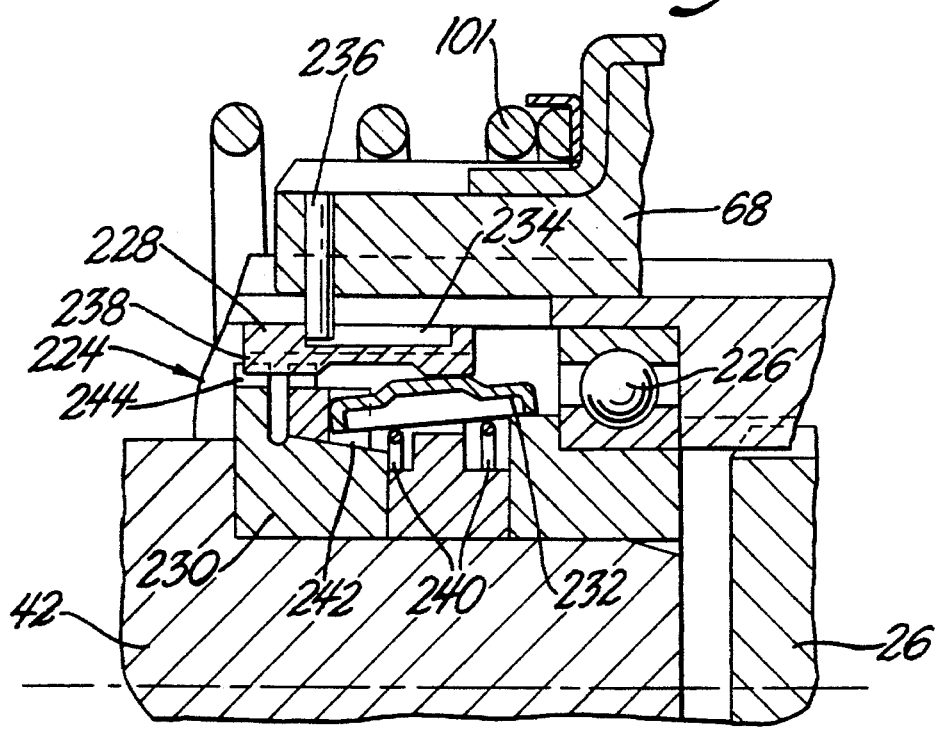
FIG. 19 is an enlarged view of the top half of the locking hub assembly and synchronizer assembly of FIG. 17 illustrating the synchronizer assembly in the fully engaged position.

As shown in FIGS. 10 and 17, the locking hub assembly 18 may also include a synchronizer assembly 224 to assist in proper alignment of the first rotatable assembly and the second rotatable assembly without clash during operation. As shown in FIG. 17–19, the engaging spring 98 may push the rotating member 68 to activate a synchronizer assembly 224 rotatably fixed by bearings 226 with the first rotatable assembly and press fit within a notch formed in the cap 42.

The synchronizer assembly 224 includes a synchronizer collar 228, a cone ring 230 and a plurality of struts 232. The synchronizer collar 228 is a tubular member having a slot 234 formed about the external circumference of the member to receive a pin 236 extending from the rotating member 68. Spaced about the inner circumference of the synchronizer collar 228 are splines 238 to receive at least three circumferentially spaced struts 232. The struts 232 extend longitudinally within the splines 238 and are pivotally balanced by springs 240 about a ring. Positioned forwardly of the struts 232 is the cone ring 230. The cone ring 230 includes a conical braking surface 242 at the rearward end of the ring and a plurality of spaced radially outwardly directed teeth 244 at the forward end of the external diameter of the ring.

In operation, as the rotating member 68 moves axially from the second position to the first position the pin 236 extending from the rotating member engages the forward side surface of the slot 234 of the synchronizer collar 228 moving the synchronizer collar forwardly, FIG. 18. The struts 232 pivot causing the forward end of the strut to frictionally engage the conical braking surface 242 of the cone ring 230 causing deceleration of the second rotatable assembly.

As the synchronizer collar 228 is pushed forwardly by the pin 236, the inner splines 238 on the synchronizer collar 228 engage the teeth 244 of the cone ring 230. Upon engagement of the inner splines 238 with the teeth 244 of the cone ring 230 the axle 26 becomes synchronous with the rotating wheel 14 and the rotating member 68 engages with the outer clutch housing 40 connecting the first rotatable assembly with the second rotatable assembly, FIG. 19.

Referring now to FIG. 20, it illustrates a bevel gear differential 310 having an electromagnetically actuated clutch gear assembly or lock 312 in accordance with the invention.

The bevel gear differential 310 comprises a housing 314 that rotatably supports a case 316 that carries an external ring gear 318, an internal spider 319, and a plurality of internal bevel gears 320 that are rotatably mounted on radial pins 321 of the spider, one of which is illustrated. The ring gear 318 is usually driven by a bevel drive gear attached to the propeller shaft of an automobile (not shown). Consequently the case 316 and internal bevel gears 320 constitute the rotatable input member or element of the differential 310 which is classically described as a planetary gear set having three relatively rotatable drive members or elements. In this case the other two drive members or elements are the side gears 322 and 324 that are attached to the respective output axle shafts 326 and 328 that have their adjacent ends supported in bearings pressed into the bore of the spider 19. The differential 310 as thus far described operates in a well-known manner that allows the output axle shafts 326 and 328 to be rotated at different speeds to accommodate turning maneuvers, tire size variations, etc.

It is also well-known that a differential can be locked up so that all three drive members or elements are forced to rotate in unison at the same speed by locking any two of the three drive members or elements together. This embodiment of the invention employs an electromagnetically actuated lock for locking two of the three drive members together.

The differential lock 312 broadly includes a first rotatable assembly, a second rotatable assembly having an axially movable rotating member, a means for moving the rotating member axially between a first position and a second position and a nonrotatable electromagnetic means fixed for nonrotation with respect to the rotatable assemblies for activating the axially moving means.

In the arrangement of the differential assembly 310 the first rotatable assembly positively engages the second rotatable assembly for simultaneous rotation in the first position.

In the second position the first rotatable assembly is disengaged from the second rotatable assembly allowing relative rotation between the two assemblies.

The first rotatable assembly includes differential case 316 and an integral extension of the case 316 that forms an outer clutch housing 330. The outer clutch housing 330 is tubular and has internal teeth 332.

The second rotatable assembly is positioned concentrically within the first rotatable assembly. The second rotatable assembly includes a hub sleeve 334 and axially movable rotating member 336. The hub sleeve 334 is an integral part of the side gear 324 that is attached to the axle shaft 28 by mating internal and external circumferentially spaced splines which intermesh.

The axially movable rotating member 336 is a clutch gear or the like that includes a tubular member having a radially extending rim 338 which has circumferentially spaced radially outwardly extending teeth 340. The interior of the tubular member has internal splines which slidably engage straight external splines of the hub sleeve 334.

The means for moving the rotating member 336 between the first position and the second position includes a cam assembly 342, an engaging spring 344, a return spring assembly 346 and an axially movable cam follower 348.

The cam assembly 342 acts as a reaction surface for the cam follower 348 to actuate the axial movement of the cam follower. The cam assembly 342 includes a clutch plate 350, reaction hub 352 and cam ramp 354 all of which are freely rotatable concentrically with respect to the axle shaft 328 and hub sleeve 334. The clutch plate 350, reaction hub 352 and cam ramp 354 are preferably formed as separate elements for greater tolerance control in assembly and manufacture. However, the clutch plate and/or reaction hub and/or cam ramp may be formed as one or two elements and perform equally as well.

The clutch plate 350 is positioned adjacent a vertical forward face of an electromagnet 356 and is tubular including a rearward flange 358 and an annular body 360. The external cylindrical surface of the body 360 is contoured to include opposing radial ramp surfaces 362 for variable surface contact with a matching radial reaction surface 364 formed on an annular extension 366 that forms part of the reaction hub 352.

One or more cylindrical retaining pins 68 may extend transversely from the external cylindrical surface of annular body 360 through an elongated slot 370 formed in the extension 366 of reaction hub 352 to assist in ease of assembly and transport of the component parts prior to assembly into the differential 310. An optional helical preload spring 372 is biased between the clutch plate 350 and reaction hub 352 to maintain the clutch plate 350 adjacent the electromagnet 356, thereby preventing excessive gap between the electromagnet 356 and the clutch plate 350.

The reaction hub 352 is positioned forward of the clutch plate 350. The reaction hub 352 is a generally rearwardly directed cam having a forward flange and a scalloped rim cut into the external cylindrical surface of the annular extension 366 which provides the radial reaction surface 364 for engagement with the matching ramp surfaces 362 of the clutch plate 350. This engagement of the reaction hub 352 allows for freedom of motion of the differential case 316 and reduces the necessity for positional tolerance control of the cam ramp 354 and cam follower 348.

The cam ramp 354 is securely fastened to the back surface of the forward flange of the reaction hub 352. The cam ramp 354 is a forwardly directed cam having a rearward flange 374 and projecting tubular side 376 having a contoured outer rim 378. The outer rim 378 of the cam ramp 354 includes at least one, and preferably two diametrically opposed V-shape notches 380 to provide a variable reaction surface consisting of at least one low height edge portion and at least one high height edge portion for the cam follower 348. The back surface of the forward flange of the reaction hub 352 and the back surface of the rearward flange 374 of the cam ramp 354 are securely fastened to one another by weldment or the like and rotate about a pilot diameter 382 of the hub sleeve 334 between a thrust washer and retaining ring 384 secured within a groove of the hub sleeve 334 and the rearward end of splines 386 of the hub sleeve. The thrust washer and retaining ring 384 act to absorb the force resulting from the axial movement of the cam ramp 354.

The cam follower 348 is positioned forward of the cam ramp 354. The cam follower 348 includes a disc member 390 having interior teeth meshing with the splines 386 of the hub sleeve 334 between the cam ramp and an intermediate retaining ring 388 that is attached to the hub sleeve 334 to retain the rotating member 336. Two prong members 392 extend radially outwardly and then forwardly from an external edge of the disc member 390 of the cam follower 348. The forwardly extending portions of the prong members 392 pass between the teeth 340 of the rim 338 and then are stepped inwardly behind the rim 338 to terminate in diametrically opposed external flats 394 formed in the tubular member of the rotating member 336. The interior teeth of the cam follower 348 and inner circumferentially spaced splines 396 of the rotating member 336 intermesh with external circumferentially spaced longitudinal splines 388 of the hub sleeve 334 to provide axial guidance to the rotating member 336 and cam follower 348 and, in the engaged position, transmit rotary motion and/or torque to the axle shaft 328 and the hub sleeve 334 from the outer clutch housing 330 and differential case 316.

An optional detent 398 may be provided at the corner of the prong member 392 to position the cam follower 348 relative to the cam ramp 354 and act as a sliding ramping surface to accommodate a complimentary notched cam ramp surface.

The engaging spring 344 and the return assembly 346 are positioned for yieldably biasing the rotating member 336 between the first position and the second position. The engaging spring 344 is positioned between the cam follower 348 and rotating member 336. The engaging spring 344 provides axial forward force to the rotating member 336 as a return spring 400 of the return assembly 346 is compressed by the cam follower 348 as further described herein. The return spring assembly 346 which surrounds the cylindrical member of the rotating member 336 includes a helical return spring 400 contained between spring retainer rings 402 and 403. The integral side gear 324 is positioned forward of the return spring assembly 346 and engages spring retainer ring 402 to restrict the forward axial movement of the return spring assembly 346 and rotating member 336 on the hub sleeve 334. Spring retainer ring 403 engages riser surfaces 393 of the prong members 392 that abut the rim 338 of the rotating member 336. During locking engagement, the riser surfaces 393 of the prong members 392 and the rim 338 compress the return spring 400 which preferably has a force greater than the opposing force of the engaging spring 344.

An electromagnetic means for activating the moving means described above is fixed for nonrotation in the axle housing 314 so that it does not rotate relative to the axle shaft 328 and differential case 316. The electromagnetic activating means includes the electromagnet 357 comprising an encapsulated electromagnetic coil 358 secured in a shell that includes a ring 359 of magnetizable material and may include a power washer such as that shown in FIGS. 14 through 16 and described earlier in the specification.

Passage (not shown) may be formed in the axle housing 314 to provide channels for wires, cables, fibre-optics and the like to provide electrical power and signals to operate the differential lock 312. Electrical power and/or signal are conveyed from a power and control source such as microprocessor 404 through a wire 406 to the electromagnetic coil 358 via a power washer or the like.

To determine the relative position of the second rotatable assembly and the moving means with respect to the electromagnetic means detection sensors may be utilized. Suitable detection sensors include Hall sensors 408 and 410 in combination with circumferential arrays of magnets 412 and 414, such as described earlier in connection with the embodiment shown in FIGS. 1–5.

As shown in FIGS. 20 and 23, the Hall sensors 408 and 410 may be secured to an integral collar of the axle housing 314 that is inward of the electromagnet 356 while the magnets 412 and 414 may be secured to the reaction hub 352 and hub sleeve 334 respectively. The Hall sensors 408 and 410 and the magnets 412 and 414 cooperatively produce two respective fluctuating signals as a result of the respective sensor magnetic fields being interrupted by the respective arrays of magnets 412 and 414 as the reaction hub 352 and hub sleeve 334 rotate. These two fluctuating signals are used to determine the respective relative rotations of the cam assembly 342 and the cam follower 348 that is splined to the hub sleeve 334 with respect to the fixed axle housing 314. The fluctuating signals are conveyed to the microprocessor 404 which uses the signals to determine the relative angular displacement of the cam assembly 342 with respect to the cam follower 348. This relative angular displacement shows whether the electromagnetically engaged lock 312 is engaged or not. That is the relative angular displacement of the cam assembly 342 with respect to the cam follower 348 indicates the axial position of the axially moveable rotating member 336 and whether it is in the first position engaging the outer clutch housing 330 for simultaneous rotation or in the second position shown in FIG. 24 where member 336 is disengaged from the outer clutch housing 330 to allow relative rotation between the differential case 316 and the axle shaft 328. The hall sensors 408 and 410 communicate with microprocessor 404 via wires 416 and 418.

To operatively engage the differential lock 312, an electric signal from microprocessor 404 energizes the electromagnetic coil 357 via wire 406 which magnetizes ring 359. Magnetic attraction generated by the electromagnet 356 fixes the clutch plate 350 of the cam assembly 342 to the electromagnet 356 thereby locking the cam assembly 342 in a fixed position as the axle shaft 328, side gear 324 and hub sleeve 334, rotating member 336 and cam follower 348 continue to rotate. As the cam follower 348 rotates, the prong members 392 move from the V-shaped notches 380, that is, from a low height edge portion (shown in solid line in FIG. 21), to a high height edge portion along the contoured edge surface 378 of the cam ramp 376 of the cam assembly 342 (shown in phantom in FIG. 21) thereby driving the cam follower 348 axially forward, that is, to the left as viewed in FIGS. 20 and 21. As the cam follower 348 moves axially forward, the return spring 400 is compressed thereby removing the rearwardly acting pressure of the return spring 400 and allowing the engaging spring 344 to force the rotating member 336 axially forward to the first position into meshing engagement with the teeth 332 of the outer clutch housing 330. This connects the axle shaft 328 and side gear 324 to the differential case 316 for simultaneous rotation via the engaged integral hub sleeve 334 and thus the differential 310 is locked-up.

As the clutch plate 350 becomes grounded on the electromagnet 356 and the cam follower 348 continues to rotate, the fluctuating signals of the Hall sensors 408 and 410 are constantly fed to the microprocessor 404 which continually monitors the relative angular or rotational position of the cam follower 348 with respect to the clutch plate 350. As indicated earlier, this relative angular position shows whether the rotating member 336 is engaged with the outer clutch housing 330 or not. When the relative angular position indicates that the rotating member 336 is engaged, the microprocessor 404 interrupts electric current to the electromagnetic coil 358. The electromagnetic coil 358 is then deenergized such that the magnetic field collapses allowing the clutch plate 350 and cam ramp 354 of the cam assembly 342 to rotate free of the electromagnet 356 and housing 314.

The differential lock 312 remains engaged with the rotating member 336 in the first position coupling the axle shaft 328 and the differential case 316 for simultaneous rotation by virtue of the cam follower 348 engaging the high height edge portion of the cam ramp 376 as shown in phantom in FIG. 21. The return spring 400 does not return the cam follower 348 even if it has a greater force than that of the engaging spring 344 because of the blocking effect of the high height edge portion of the cam ramp 376.

To disengage the differential lock 312 from the first position, an electric signal from the microprocessor 404 reenergizes the electromagnetic coil 358 thereby preventing the clutch plate 350, reaction hub 352 and cam ramp 354 of the cam assembly 342 from rotating. The rotating cam follower 348 then moves from the high height edge portion of the contoured edge surface 378 of the cam ramp 354 to the low height edge portion of the V-shaped notches 380 of the cam ramp 354 thereby moving the rotating cam follower 348 axially rearward. As the cam follower 348 moves axially rearward, the return spring 400 pushes the rotating member 336 out of engagement with the outer clutch housing 330 and compresses the engaging spring 344 between the rotating member 336 and the cam follower 348. The hall sensors 408, 410 and microprocessor 404 then detects from the relative angular position of the cam follower 348 with respect to the cam assembly when the rotating member 336 is disengaged. When this occurs the microprocessor 404 interrupts electric current to the electromagnetic coil 358 thereby releasing the clutch plate 350, reaction hub 352 and cam ramp 354 of the cam assembly 342 to freely rotate in synchronization with the cam follower 348. The differential lock 312 is now disengaged with the rotating member 336 in the second position shown in FIG. 20. This frees the axle shaft 328 and differential case 316 for relative rotation with respect to each other and restores differential action to the differential 310.

The electromagnetically actuated lock 312 is bidirectional as it engages and disengages in response to clockwise or counterclockwise rotation of the axle shaft 328. The electrically actuated lock 312 can be controlled manually with a simple on-off switch for microprocessor 404. It can also be controlled automatically by an auxiliary system. For instance, the differential 310 can be locked automatically in the event of excessive wheel slip by feeding a wheel acceleration signal to the microprocessor 404 from an accelerometer 420 that is attached to the axle shaft 328 and linked to the microprocessor 404 by a slip ring 422 and wire 424.

Although the operation of the differential lock 12 has been described in detail with respect to the embodiment of the present invention as shown in FIGS. 20 through 23, it will be readily apparent to one skilled in the art that the same principle of operation is applicable to other locations in the differential and to other type differentials.

For instance, the differential lock 312 can be adapted to couple the axle shaft 326 rather than the axle shaft 328 to the case 316 to lock-up the differential or to couple the axle shafts 326 and 328 together, it being merely necessary to lock any two of the three drive members together. Moreover, the rotating member 336 can be slidably attached to any of the three drive members. The differential lock 312 can also be adapted to a planetary gear differential of the type that has a concentrically arranged sun gear, planet carrier and ring gear.

It is also possible to use alternatives to determine the relative position of the second rotatable assembly and the moving means with respect to the electromagnetic means. One such alternative is illustrated in connection with a modified differential 500 shown in FIGS. 24 and 25.

The modified differential 500 includes proximity switches in combination with position markers such as described earlier in connection with the embodiment shown in FIG. 9 in place of the Hall sensors 408 and 410 and the arrays of magnets 412 and 14. With the exception of a suitably programmed microprocessor 504, the modified differential 500 is otherwise basically the same and corresponding parts are identified by the same numbers.

This position signal generating alternative has been incorporated in the modified differential 500 in the form of two position or proximity switches 508 and 510 and two position markers 512 and 514.

As shown in FIGS. 24 and 25, the proximity switches 508 and 510 are secured to an integral collar of the axle housing 314 outward of the electromagnet 356.

The first position marker 512 is journalled in an axially fixed position in the bore of the outer clutch housing 330 that is integrally formed as part of the differential case 316. The body 516 of position marker 512 lies in the bore so that it is rotated by cam follower 348. Position marker 512 also has a flange 518 containing one or more equally spaced circumferential slots or apertures that rotate adjacent to the first proximity switch 508 that is nonrotatably mounted in the axle housing 314.

The second position marker 514 is an integral part of the cam assembly 342 and more particularly the clutch plate 350. In this instance, the rearward flange 358 of the clutch plate 350 contains one or more equally spaced circumferential slots or apertures that rotate adjacent to the second proximity switch 510 that is nonrotatably mounted in the axle housing 314.

The proximity switches or sensors 508 and 510 and the position markers 512 and 514 cooperatively produce two respective signals as a result of the slots or apertures of the respective position markers 512 and 514 passing the respective sensors 508 and 510 as the clutch plate 350 and the cam follower 348 splined to the hub sleeve 334 rotate. These two signals are used to determine the respective relative rotations of the cam assembly 342 and the cam follower 348 with respect to the axle housing 314. The signals are conveyed to the microprocessor 504 which uses the signals to determine the relative angular displacement of the cam assembly 342 with respect to the cam follower 348. This relative angular displacement shows whether the electromagnetically engaged lock 312 is engaged or not. That is the relative angular displacement of the cam assembly 342 with respect to the cam follower 348 indicates the axial position of the axially moveable rotating member 336 and whether it is in the first position engaging the outer clutch housing 330 for simultaneous rotation or in the second position disengaged from the outer clutch housing to allow relative rotation between the differential case 316 and the axle shaft 328. The proximity sensors 508 and 510 communicate with microprocessor 504 via wires 520 and 522.

To operatively engage the differential lock 312, an electric signal from microprocessor 504 energizes the electromagnet 356 to lock the cam assembly 342 in a fixed position as the axle shaft 328, side gear 324 and hub sleeve 334, rotating member 336 and cam follower 348 continue to rotate. As the cam follower 348 rotates, the prong members 392 move from the V-shaped notches 380, that is, from a low height edge portion (shown in solid line in FIG. 21), to a high height edge portion along the contoured edge surface 378 of the cam ramp 376 of the cam assembly 342 (shown in phantom in FIG. 21) thereby driving the cam follower 348 to the left as viewed in FIGS. 21 and 24 to the first position into meshing engagement with the teeth 332 of the outer clutch housing 330. This connects the axle shaft 328 and side gear 324 to the differential case 316 for simultaneous rotation via the engaged integral hub sleeve 34 and thus the differential 310 is locked-up.

As the clutch plate 350 becomes grounded on the electromagnet 356 and the cam follower 348 continues to rotate, the signals of the proximity switches 508 and 510 are constantly fed to the microprocessor 504 which continually monitors the relative angular or rotational position of the cam follower 348 with respect to the clutch plate 350. When the relative angular position indicates that the rotating member 336 is engaged, the microprocessor 504 deenergizes the electromagnet 356 allowing the clutch plate 350 and cam ramp 354 of the cam assembly 342 to rotate free of the electromagnet 356 and housing 314.

To disengage the differential lock 312 from the first position, an electric signal from the microprocessor 504 reenergizes the electromagnet 356 coil 358 thereby preventing the clutch plate 350, reaction hub 352 and cam ramp 354 of the cam assembly 342 from rotating. The rotating cam follower 348 then moves from the high height edge portion of the contoured edge surface 378 of the cam ramp 354 to the low height edge portion of the V-shaped notches 380 of the cam ramp 354 thereby moving the rotating cam follower 348 axially rearward and the return spring 400 pushes the rotating member 336 out of engagement with the outer clutch housing 330. The sensors 508 and 510 and microprocessor 504 then detect from the relative angular position of the cam follower 348 with respect to the cam assembly 342 when the rotating member 336 is disengaged. When this occurs the microprocessor 504 interrupts electric current to the electromagnetic coil 358 thereby releasing the clutch plate 350, reaction hub 352 and cam ramp 354 of the cam assembly 342 to freely rotate in synchronization with the cam follower 348. The differential lock 312 is now disengaged with the rotating member 336 in the second position shown in FIG. 24. This frees the axle shaft 328 and differential case 316 for relative rotation with respect to each other and restores differential action to the differential 310.

The electromagnetically actuated lock 312 of differential 500 can also be controlled manually with a simple on-off switch for microprocessor 504. It can also be controlled automatically by an auxiliary system. For instance, the differential 500 can be locked automatically in the event of excessive wheel slip by feeding two speed signals to the microprocessor 504 that indicate the respective speeds of the differential case 316 and the axle shaft 328. These speed signals may be generated by series of teeth 524 and 526 that are integrally formed on the differential case 316 and the axle shaft 328 that are located next to respective proximity switches or sensors 528 and 530 that are mounted on the axle housing 314. As the differential case 316 and the axle shaft 328 rotate, the series of teeth 524 and 526 pass by the sensors 528 and 530 generating speed signals that are fed to the microprocessor 504 via wires 532 and 534. The microprocessor 504 compares the speed signals and when a speed differential above a predetermined threshold which indicates wheel slip occurs, the microprocessor 504 energizes the electromagnet 356 to engage the differential lock 312. The microprocessor 504 constantly monitors the speed signals so that when the speed differential drops below the predetermined threshold, the electromagnet 356 is energized by the microprocessor 504 to disengage the differential lock 312.

This auxiliary system for operating the differential lock 312 automatically can be used with the earlier embodiment of the differential shown in FIGS. 20–23. On the other hand the auxiliary system of that embodiment that uses an accelerometer 420 can also be used in this latter embodiment shown in FIGS. 24 and 25.

Figure 26:
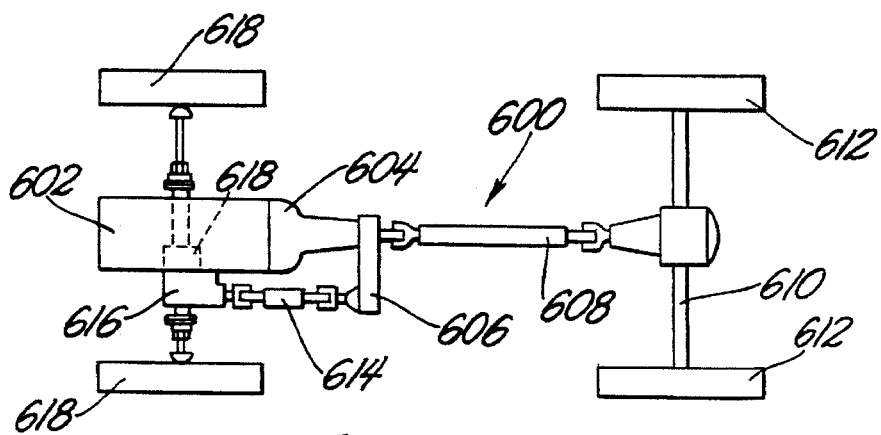
FIG. 26 is a schematic plan view of a part time four wheel drive vehicle.

Referring now to FIG. 26, there is shown a schematic plan view of a part time four wheel drive vehicle 600 comprising engine 602, transmission 604 and transfer case 606 mounted on a vehicle chassis (not shown). The engine 602 and transmission 604 are conventional and well known components as is the transfer case 606 which typically includes an input shaft (not shown), a main output shaft and an auxiliary output shaft. The main output shaft is drive connected to the input shaft by a clutch or the like in the transfer case 606 and customarily offset from it. The clutch is actuated by a suitable selector mechanism (not shown) controlled by the vehicle driver.

The main output shaft is drivingly connected to a rear propeller shaft 608 which in turn is drivingly connected to a rear differential of a rear drive axle 610 that drives rear wheels 612 in a well known manner.

The auxiliary output shaft is drivingly connected to a front propeller shaft 614 which in turn is drivingly connected to a front differential of a front drive axle 616 for selectively driving front wheels 618. The front drive axle 616 includes an axle disconnect in accordance with the invention that is generally indicated at 620.

Figure 27:
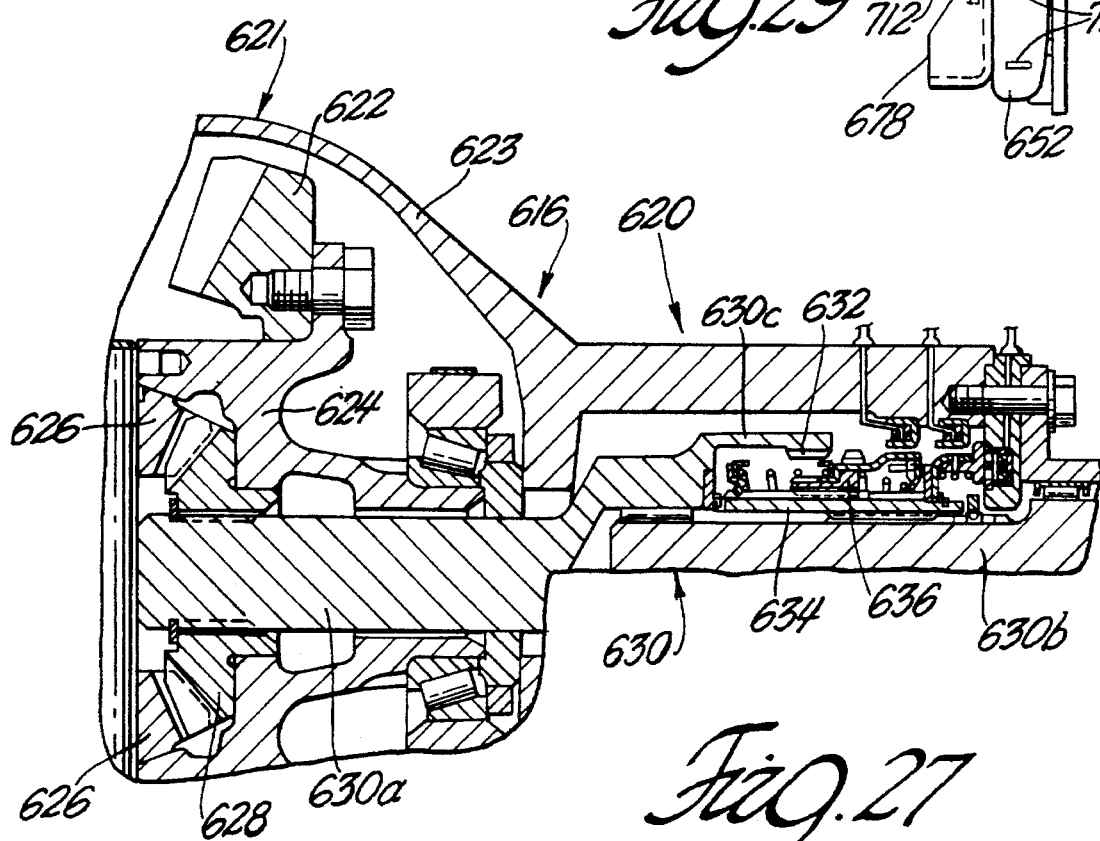
FIG. 27 is a fragmentary sectional view of the front drive axle of the vehicle that is shown schematically in FIG. 16.

Referring now to FIG. 27, the differential 621 of the front drive axle 616 is a conventional automotive type bevel gear differential comprising a ring gear 622 that is driven by a pinion gear (not shown) attached to the end of propeller shaft 614 shown in FIG. 26. The ring gear 622 drives a case 624 that is rotatably mounted in the axle housing 623. Two rotatable pinion gears 626 and two rotatable side gears 628 (one shown) are inside case 624. The pinion gears 626 are journalled or rotatably mounted on a cross pin carried by the case 624 and mesh with each of the side gears 628. The side gears 628 are connected to the ends of respective axle shafts 630 for driving front wheels 618 via universal joints and half shafts. One axle shaft 630, in this instance, the right axle shaft is split into an inner axle shaft 630a and an outer axle shaft 630b that operate in conjunction with the axle disconnect 620.

The axle disconnect 620 broadly includes a first rotatable assembly, a second rotatable assembly having an axially movable rotating member, a means for moving the rotating member axially between a first position and a second position and a nonrotatable electromagnetic means fixed for nonrotation with respect to the rotatable assemblies for activating the axially moving means. The first rotatable assembly positively engages the second rotatable assembly for simultaneous rotation in the first position. In the second position the first rotatable assembly is disengaged from the second rotatable assembly allowing relative rotation between the two assemblies.

Figure 28:
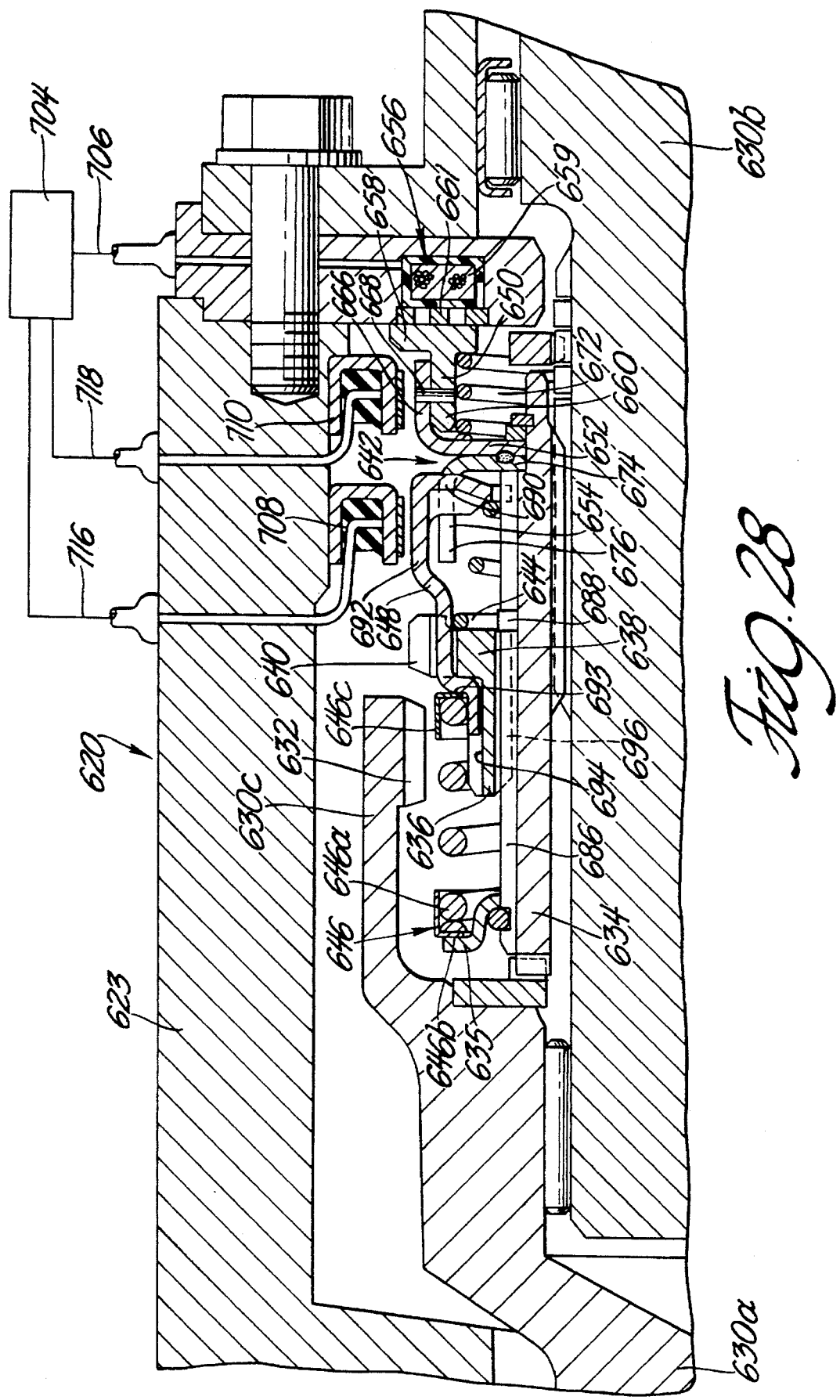
FIG. 28 is an enlargement of a portion of FIG. 27.

The first rotatable assembly includes inner axle shaft 630a and an integral extension of the inner axle shaft 630a that forms an outer clutch housing 630c. The outer clutch housing 630c is tubular and has internal teeth 632 as best shown in FIG. 28.

The second rotatable assembly is positioned concentrically within the first rotatable assembly. The second rotatable assembly includes a hub sleeve 634 and axially movable rotating member 636. The hub sleeve 634 is nonrotatably attached to the outer axle shaft 630b by mating internal and external circumferentially spaced splines which intermesh.

The axially movable rotating member 636 is a clutch gear or the like that includes a tubular member having a radially extending rim 638 which has circumferentially spaced radially outwardly extending teeth 640. The interior of the tubular member has internal splines which slidably engage straight external splines of the hub sleeve 634.

The means for moving the rotating member 636 between the first position and the second position includes a cam assembly 642, an engaging spring 644, a return spring assembly 646 and an axially movable cam follower 648.

The cam assembly 642 acts as a reaction surface for the cam follower 648 to actuate the axial movement of the cam follower. The cam assembly 642 includes a clutch plate 650, reaction hub 652 and cam ramp 654 all of which are freely rotatable concentrically with respect to the outer axle shaft 630b and hub sleeve 634. The clutch plate 650, reaction hub 652 and cam ramp 654 are preferably formed as separate elements for greater tolerance control in assembly and manufacture. However, the clutch plate and/or reaction hub and/or cam ramp may be formed as one or two elements and perform equally as well.

The clutch plate 650 is positioned adjacent a vertical forward face of an electromagnet 656 and is tubular including a rearward flange 658 and an annular body 660. The external cylindrical surface of the body 660 is contoured to include opposing radial ramp surfaces (such as the ramp surfaces 362 shown in FIG. 22) for variable surface contact with a matching radial reaction surface (such as surface 364 shown in FIG. 22) formed on an annular extension 666 that forms part of the reaction hub 652.

One or more cylindrical retaining pins 668 may extend transversely from the external cylindrical surface of annular body 660 through an elongated slot (such as slot 370 shown in FIG. 22) formed in the extension 666 of reaction hub 652 to assist in ease of assembly and transport of the component parts prior to assembly into the axle disconnect 620. An optional helical preload spring 672 is biased between the clutch plate 650 and reaction hub 652 to maintain the clutch plate 650 adjacent the electromagnet 656, thereby preventing excessive gap between the electromagnet 656 and the clutch plate 650.

The reaction hub 652 is positioned forward of the clutch plate 650. The reaction hub 652 is a generally rearwardly directed cam having a forward flange and a scalloped rim cut into the external cylindrical surface of the annular extension 666 which provides the radial reaction surface (such as surface 64 shown in FIG. 22) for engagement with the matching ramp surfaces (such as ramp surfaces 362 in shown FIG. 22) of the clutch plate 650. This engagement of the reaction hub 652 allows for freedom of motion of the inner axle shaft 630a and reduces the positional tolerance control of the cam ramp 654 and cam follower 648.

Figure 29:
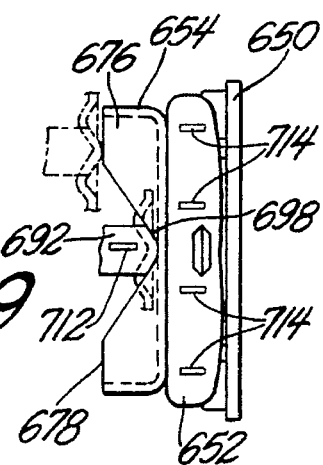
FIG. 29 is a view taken substantially along the line 29—29 of FIG. 28 looking in the direction of the arrows.

The cam ramp 654 is securely fastened to the back surface of the forward flange of the reaction hub 652. The cam ramp 654 is a forwardly directed cam having a rearward flange 674 and projecting tubular side 676 having a contoured outer rim 678. The outer rim 678 of the cam ramp 654 includes at least one, and preferably two diametrically opposed V-shape notches 680 as best shown in FIG. 29 to provide a variable reaction surface consisting of at least one low height edge portion and at least one high height edge portion for the cam follower 648. The back surface of the forward flange of the reaction hub 652 and the back surface of the rearward flange 674 of the cam ramp 654 are fastened to one another by weldment or the like. The fastened flanges of cam assembly 642 rotate about a pilot diameter of the hub sleeve 634 between a thrust washer and retaining ring seated within a groove of the hub sleeve 634 and the rearward end of splines 686 of the hub sleeve. The thrust washer and retaining ring resist the axial force acting on the cam ramp 654 during the camming operation.

The cam follower 648 is positioned forward of the cam ramp 654. The cam follower 648 includes a disc member 690 having interior teeth meshing with the splines 686 of the hub sleeve 634 between the cam ramp and an intermediate retaining ring 688 that is attached to the hub sleeve 634 to retain the rotating member 636. Two prong members 692 extend radially outwardly and then forwardly from an external edge of the disc member 690 of the cam follower 648. The forwardly extending portions of the prong members 692 pass between the teeth 640 of the rim 638 and then are stepped inwardly behind the rim 638 to terminate in diametrically opposed external flats 694 formed in the tubular member of the rotating member 636. The interior teeth of the cam follower 648 and inner circumferentially spaced splines 696 of the rotating member 636 intermesh with external circumferentially spaced longitudinal splines 686 of the hub sleeve 634 to provide axial guidance to the rotating member 636 and cam follower 648 and, in the engaged position, transmit rotary motion and/or torque to the axle shaft 630b and the hub sleeve 634 from the outer clutch housing 630c and inner axle shaft 630a.

An optional detent 698 may be provided at the corner of the prong member 692 to position the cam follower 648 relative to the cam ramp 654 and act as a sliding ramping surface to accommodate a complimentary notched cam ramp surface.

The engaging spring 644 and the return assembly 646 are positioned for yieldably biasing the rotating member 636 between the first position and the second position. The engaging spring 644 is positioned between the cam follower 648 and rotating member 636. The engaging spring 644 provides axial forward force to the rotating member 636 as a return spring 646a of the return assembly 646 is compressed by the cam follower 648 as further described herein. The return spring assembly 646 which surrounds the cylindrical member of the rotating member 636 includes a helical return spring 646a contained between spring retainer rings 646b and 646c. The hub sleeve 634 carries a stop ring 635 that is positioned forward of the return spring assembly 346 and engages spring retainer ring 646b to restrict the forward axial movement of the return spring assembly 646 and rotating member 636 on the hub sleeve 634. Spring retainer ring 646c engages riser surfaces 693 of the prong members 692 that abut the rim 638 of the rotating member 636. During locking engagement, the riser surfaces 693 of the prong members 692 and the rim 638 compress the return spring 646a which preferably has a force greater than the opposing force of the engaging spring 644.

An electromagnetic means for activating the moving means described above is fixed for nonrotation in the axle housing 623 so that it does not rotate relative to the inner axle shaft 630a and the outer axle shaft 630b. The electromagnetic activating means includes the electromagnet 656 comprising an encapsulated electromagnetic coil 659 and a ring 661 of magnetizable material.

Passages may be formed in the axle housing 623 as shown to provide channels for wires, cables, fibre-optics and the like to provide electrical power and signals to operate the axle disconnect 620. Electrical power and/or signal are conveyed from a power and control source such as microprocessor 704 through a wire 706 to the electromagnetic coil 659.

To determine the relative position of the second rotatable assembly and the moving means with respect to the electromagnetic means, suitable detection sensors such as Hall sensors in combination with circumferential arrays of magnets, or proximity sensors in combination with position markers may be used as described above in connection with earlier embodiments.

As shown in FIGS. 27 and 28, proximity switches 708 and 710 may be secured to an integral collar of the axle housing 623 that houses the axle disconnect in proximity to the cam follower 648 and the reaction hub 652 of the cam assembly 642 respectively. The cam follower 648 and the reaction hub 652 have equally circumferentially spaced indents or markings 712 and 714 juxtaposed the respective proximity switches. The proximity switches 708 and 710 and the indents 712 and 714 cooperatively produce two respective fluctuating signals as a result of the rotation of the cam follower 648 and the reaction hub 652. These two fluctuating signals are used to determine the respective relative rotations of the cam assembly 642 and the cam follower 648 that is splined to the hub sleeve 634 with respect to the fixed axle housing 623. The fluctuating signals are conveyed to the microprocessor 704 which uses the signals to determine the relative angular displacement of the cam assembly 642 with respect to the cam follower 648. This relative angular displacement shows whether the electromagnetically engaged axle disconnect 620 is engaged or not. That is the relative angular displacement of the cam assembly 642 with respect to the cam follower 648 indicates the axial position of the axially moveable rotating member 636 and whether it is in the first position engaging the outer clutch housing 630c for simultaneous rotation or in the second position shown in FIG. 28 where member 636 is disengaged from the outer clutch housing 630c to allow relative rotation between the inner axle shaft 630a and the outer axle shaft 630b. The proximity switches 708 and 710 communicate with microprocessor 704 via wires 716 and 718 respectively.

To operatively engage the axle disconnect 620, an electric signal from microprocessor 704 energizes the electromagnetic coil 659 via wire 706 which magnetizes ring 661. Magnetic attraction generated by the electromagnet 656 fixes the clutch plate 650 of the cam assembly 642 to the electromagnet 656 thereby locking the cam assembly 642 in a fixed position as the outer axle shaft 630b and hub sleeve 634, rotating member 636 and cam follower 648 continue to rotate. As the cam follower 648 rotates, the prong members 692 move from the V-shaped notches 680, that is, from a low height edge portion (shown in solid line in FIG. 29), to a high height edge portion along the contoured edge surface 678 of the cam ramp 676 of the cam assembly 642 (shown in phantom in FIG. 29) thereby driving the cam follower 648 axially forward, that is, to the left as viewed in FIGS. 27 and 28. As the cam follower 648 moves axially forward, the return spring 646a is compressed thereby removing the rearwardly acting pressure of the return spring 646a and allowing the engaging spring 644 to force the rotating member 636 axially forward to the first position into meshing engagement with the teeth 632 of the outer clutch housing 630c. This connects the outer axle shaft 630b to the inner axle shaft 630a for simultaneous rotation via the engaged integral hub sleeve 634 and thus the inner and outer axle shafts 630a and 630b are drivingly connected.

As the clutch plate 650 becomes grounded on the electromagnet 656 and the cam follower 648 continues to rotate, the fluctuating signals of the proximity switches 708 and 710 are constantly fed to the microprocessor 704 which continually monitors the relative angular or rotational position of the cam follower 648 with respect to the clutch plate 650. As indicated earlier, this relative angular position shows whether the rotating member 636 is engaged with the outer clutch housing 630c or not. When the relative angular position indicates that the rotating member 636 is engaged, the microprocessor 704 interrupts electric current to the electromagnetic coil 659. The electromagnetic coil is then deenergized such that the magnetic field collapses allowing the clutch plate 650 and cam ramp 654 of the cam assembly 642 to rotate free of the electromagnet 656 and housing 623.

The axle disconnect 620 remains engaged with the rotating member 636 in the first position drivingly connecting the inner and outer axle shafts 630 and 630b by virtue of the cam follower 648 engaging the high height edge portion of the cam ramp 676 as shown in phantom in FIG. 29. The return spring 646a does not return the cam follower 648 even if it has a greater force than that of the engaging spring 644 because of the blocking effect of the high height edge portion of the cam ramp 676.

To disengage the axle disconnect 620 from the first position, an electric signal from the microprocessor 704 reenergizes the electromagnetic coil 659 thereby preventing the clutch plate 650, reaction hub 652 and cam ramp 654 of the cam assembly 642 from rotating. The rotating cam follower 648 then moves from the high height edge portion of the contoured edge surface 678 of the cam ramp 654 to the low height edge portion of the V-shaped notches 680 of the cam ramp 654 thereby moving the rotating cam follower 648 axially rearward. As the cam follower 648 moves axially rearward, the return spring 646a pushes the rotating member 636 out of engagement with the outer clutch housing 630c and compresses the engaging spring 644 between the rotating member 636 and the cam follower 648. The proximity switches 708, 710 and microprocessor 704 then detect from the relative angular position of the cam follower 648 with respect to the cam assembly when the rotating member 636 is disengaged. When this occurs the microprocessor 704 interrupts electric current to the electromagnetic coil 659 thereby releasing the clutch plate 650, reaction hub 652 and cam ramp 654 of the cam assembly 642 to freely rotate in synchronization with the cam follower 648. The axle disconnect is now disengaged with the rotating member 636 in the second position shown in FIG. 28. This frees the inner and outer axle shafts 630a and 630b for relative rotation with respect to each other and prevents back drive from the vehicle wheels.

The electromagnetically actuated axle disconnect 620 is bidirectional as it engages and disengages in response to clockwise or counterclockwise rotation of the outer axle shaft 630b. The electrically actuated axle disconnect 620 can be controlled manually with a simple on-off switch for microprocessor 704. It can also be controlled automatically by an auxiliary system as described above in connection with earlier embodiments.

Having described presently preferred embodiments of the invention, it is to be understood that it may be otherwise embodied within the scope of the appended claims.

The documents, patents and patent applications referred to herein are hereby incorporated by reference. Having described presently preferred embodiments of the invention, it is to be understood that it may be otherwise embodied within the scope of the appended claims.

We claim:

1. A power transmitting assembly having a first drive member and a second drive member that are mounted on a fixed support and selectively locked together for rotation in unison with respect to the support, the power transmitting assembly comprising:

a first rotatable assembly in communication with the first drive member, a second rotatable assembly in communication with the second drive member, the second rotatable assembly including an axially movable rotating member, means for moving the rotating member axially between a first position where the first rotatable assembly operatively engages the second rotatable assembly for locking the drive members together and a second position where the first rotatable assembly disengages from the second rotatable assembly; and an electromagnetic clutch having a non rotatable coil attached to the fixed support for nonrotation with respect to the first drive member and the second drive member for activating the moving means.

2. The power transmitting assembly of claim 1 wherein the moving means comprises:

a cam rotatable about said second rotatable assembly that is braked against rotation by the electromagnetic clutch for activating the moving means.

3. The power transmitting assembly of claim 1 wherein the moving means comprises:

a cam rotatable about the second rotatable assembly including a contoured outer rim having at a low height edge portion and a high height edge portion;

a return spring for yieldably biasing the rotating member toward the second position, an axially movable cam follower rotatable with the second rotatable assembly and responsive to the contoured outer rim of the cam assembly; whereby the electromagnetic clutch activates the moving means by braking the cam against rotation to cause the cam follower to move axially as the cam follower rotates between said low height edge portion and high height edge portion and compresses the return spring enabling axial movement of the rotating member to the first position.

4. The power transmitting assembly of claim 3 wherein the moving means further comprises an engaging spring for axially moving the rotating member to the first position.

5. The power transmitting assembly of claim 3 wherein the cam is an assembly comprising a reaction hub that carries the contoured outer rim and a clutch plate, and wherein the power transmitting assembly further comprises a spring disposed between the clutch plate and the reaction hub for biasing the clutch plate toward the coil of the electromagnetic clutch.

6. The power transmitting assembly of claim 3 wherein the cam is an assembly comprising a reaction hub that carries the contoured outer rim and a clutch plate, and wherein the reaction hub and the clutch plate have cooperating surfaces that spread the reaction hub and the clutch plate apart to bias the clutch plate toward the coil of the electromagnetic clutch when the electromagnetic clutch brakes the cam against rotation to cause the cam follower to move axially as the cam follower rotates between the low height edge portion and the high height edge portion of the contoured outer rim.

7. The power transmitting assembly of claim 6 wherein the reaction hub has a scalloped rim that engages ramp surfaces of the clutch plate.

8. The power transmitting assembly of claim 3 further comprising means for signalling the respective rotational speeds of the cam and the cam follower.

9. The power transmitting assembly of claim 3 further comprising means for determining the angular displacement of the cam follower with respect to the cam and wherein the electromagnetic clutch is energized to activate the moving means for moving the rotating member axially to the first position or to the second position and wherein the means for determining the angular displacement deenergizes the electromagnetic clutch means at a predetermined angular displacement that enables axial movement of the rotating member from one position to the other.

10. A power transmitting assembly having a first drive member and a second drive member that are rotatably mounted on a fixed support and a gear clutch for locking the first drive member and the second drive member together so that the drive members rotate in unison with respect to the support, the power transmitting assembly comprising:

the gear clutch having an axially fixed clutch gear carried by the first drive member and an axially moveable clutch gear carried by the second drive member, means including a cam assembly rotatably carried by the second drive member for moving the axially moveable clutch gear axially between a first position where it engages the fixed clutch gear for locking the drive members together and a second position where it disengages from the fixed clutch gear; and an electromagnetic clutch having a coil attached to the support for braking the cam assembly against rotation for activating the moving means;

the cam assembly comprising a reaction hub and a clutch plate that have cooperating surfaces that spread the reaction hub and the clutch plate apart to bias the clutch plate toward the coil of the electromagnetic clutch when the electromagnetic clutch brakes the cam against rotation to activate the moving means.

11. A power transmitting assembly having a first drive member and a second drive member that are rotatably mounted on a fixed support and a gear clutch for locking the first drive member and the second drive member together so that the drive members rotate in unison with respect to the support, the power transmitting assembly comprising:

the gear clutch having an axially fixed clutch gear carried by the first drive member and an axially moveable clutch gear carried by the second drive member, means including a cam rotatably carried by the second drive member and a cam follower non rotatably carried by the second drive member for moving the axially moveable clutch gear axially between a first position where it engages the fixed clutch gear for locking the drive members together and a second position where it disengages from the fixed clutch gear; and an electromagnetic clutch having a coil attached to the support for braking the cam against rotation for activating the moving means.

12. The power transmitting assembly of claim 11 wherein the power transmitting assembly is a locking hub assembly for operatively engaging and disengaging a power driven shaft to a wheel and the second drive member is the power driven shaft.

13. The power transmitting assembly of claim 11 wherein the power transmitting assembly is a differential assembly and the first and second drive members are drive members of the differential.

14. The power transmitting assembly of claim 11 wherein the power transmitting assembly is an axle disconnect for operatively engaging and disengaging a power driven shaft to a wheel and the first drive member is the power driven shaft.

15. The power transmitting assembly of claim 14 wherein the axle disconnect forms part of a differential assembly having a side gear that is connected to an axle shaft for driving a vehicle wheel that is split into an inner axle shaft and an outer axle shaft that correspond to the first drive member and the second drive member respectively.

16. A locking hub assembly operatively engaging and disengaging a power driven axle to a wheel, the locking hub assembly comprising:

a first rotatable assembly in communication with the wheel;

a second rotatable assembly in communication with the power driven axle, said second rotatable assembly including an axially movable rotating member;

means for moving the rotating member axially between a first position, wherein said first rotatable assembly operatively engages said second rotatable assembly, and a second position, wherein said first rotatable assembly is disengaged from said second rotatable assembly; and a nonrotatable electromagnetic means, inboard of said second rotatable assembly fixed for nonrotation about the axle for activating said moving means.

17. A locking hub assembly operatively engaging and disengaging a power driven axle to a wheel, the locking hub assembly comprising:

a first rotatable assembly in communication with the wheel;

a second rotatable assembly in communication with the power driven axle, said second rotatable assembly including an axially movable rotating member;

a means for moving the rotating member axially between a first position, wherein said first rotatable assembly operatively engages said second rotatable assembly, and a second position, wherein said first rotatable assembly is disengaged from said second rotatable assembly;

a nonrotatable electromagnetic means fixed for nonrotation about the axle for activating said moving means;

the moving means comprising;

a cam assembly rotatable about said second rotatable assembly including a contoured outer rim having at least one V-shape notch to form a low height edge portion and a high height edge portion;

an engaging spring and a return spring for yieldably biasing said rotating member between said first position and said second position; and an axially movable cam follower rotatable with said axle and responsive to said contoured outer rim of said cam assembly; whereby said electromagnetic means activates said moving means by locking said cam assembly against rotation to cause said cam follower to move axially as said cam follower rotates between said high height edge portion, such that said cam follower compresses said return spring enabling said engaging spring to axially move said rotating member to the first position; and said low height edge portion, such that said cam follower releases said return spring to axially move said rotating member to the second position thereby compressing said engaging spring.

18. The locking hub assembly of claim 17 wherein said cam assembly comprises:

a clutch plate juxtaposed said electromagnetic activating means, said clutch plate including a flange contoured to include at least two opposing ramp surfaces;

a reaction hub juxtaposed said clutch plate, said reaction hub including a scalloped rim for matching engagement with said ramp surfaces; and said contoured outer rim having formed therein at least one v-shaped notch to form a low height edge portion and a high height edge portion being secured to or an integral part of said reaction hub.

19. The locking hub assembly of claim 17 wherein said cam assembly comprises:

a stepped tubular member having an end surface, said tubular member being rotatable about said second rotatable assembly and juxtaposed said electromagnetic means; and a cam ramp secured to said tubular member end surface, said cam ramp including said contoured outer rim having formed therein at least one v-shaped notch to form a low height edge portion and a high height edge portion.

20. The locking hub assembly of claim 17 wherein said cam assembly comprises:

a clutch plate juxtaposed said electromagnetic activating means, said clutch plate including a disc like member having a projecting tubular member including a flange defining an outer annular shoulder surface and an inner annular shoulder surface, said outer annular shoulder surface contoured to include at least two opposing ramp surfaces;

a reaction hub juxtaposed said clutch plate, said reaction hub including a bottom disc member and an integral projecting tubular side having a scalloped rim for matching engagement with said ramp surfaces; and a cam ramp secured to said reaction hub bottom disc, said cam ramp including a disc member and an integral projecting tubular side having said contoured outer rim having formed therein at least one v-shaped notch to form a low height edge portion and a high height edge portion.

21. The locking hub assembly of claim 17 wherein said cam assembly comprises:

a clutch plate juxtaposed said of electromagnetic activating means, said clutch plate having a plurality of spaced radially inwardly directed circumferential splines;

a reaction hub juxtaposed said clutch plate, said reaction hub including a disc member and an integral projecting tubular side having a plurality of spaced radially outwardly directed circumferential splines for engagement with said radially inwardly directed clutch plate splines; and a cam ramp secured to said reaction hub disc member said cam ramp including a disc member and an integral projecting tubular side having said contoured outer rim having formed therein at least one v-shaped notch to form a low height edge portion and a high height edge portion.

22. The locking hub assembly of claim 21 further comprising a spring disposed between said clutch plate and said reaction hub for biasing said clutch plate against said electromagnetic means.

23. The locking hub assembly of claim 17 further comprising means for determining the axial position of said rotating member by detecting a relative angular displacement of said second rotatable assembly with respect to said electromagnetic means.

24. The locking hub assembly of claim 17 further comprising means for determining axial position of said rotating member by detecting a relative angular displacement of said moving means with respect to said electro-magnetic means.

25. The locking hub assembly of claim 17 further comprising a means for determining axial position of said rotating member by detecting a relative angular displacement of said moving means and second rotatable assembly with respect to said electro-magnetic means.

26. The locking hub assembly of claim 25 wherein said determining means comprises:

means in communication with said second rotatable assembly for signaling an angular displacement of said second rotatable assembly;

at least one sensor in communication with said electromagnetic activating means responsive to said signaling means to detect the relative angular displacement between said second rotatable assembly and said electro-magnetic means; and a signal processor in communication with said sensor for measuring the relative angular displacement between said second rotatable assembly and said electromagnetic means to determine the axial position of said axially movable rotating member.

27. The locking hub assembly of claim 17 wherein said cam following comprises:

a ring member including radially inwardly extending teeth for engaging longitudinal splines of said hub sleeve; and two prong members extending radially outwardly and axially from an outer edge of said ring member, said prong members extending over said rotating member flat surfaces and between the rotating member teeth of said rim, said prong members stepped inwardly toward a central axis of said ring member to provide a reaction surface to compress said return spring as said cam follower moves axially responsive to said cam assembly.

28. The locking hub assembly of claim 27 wherein said electro-magnetic means is fixed to a tubular spindle surrounding said power driven axle, said tubular spindle and said power driven axle forming an annular passage therebetween.

29. The locking hub assembly of claim 27 wherein said electromagnetic activating means comprises:

a magnetic coil of encapsulated interior windings of wire having an annular shape; and a power washer of a disc shape positioned contiguous said magnetic coil, said power washer including a plurality of conductor rings separated by a plurality of insulator rings, said conductor rings in communication with said magnetic coil, at least one sensor and signal processor.

30. The locking hub assembly of claim 29 wherein said first rotatable assembly comprises:

a rotor of a tubular shape having about an inner circumference thereof, a plurality of spaced splines extending longitudinally inboard from an outboard end of said rotor and an inner circumferential retaining groove outboard of said splines; and an outer clutch housing positioned concentrically within said rotor and of a tubular shape having about an outboard inner circumference, spaced radially inwardly directed teeth, and about an outer circumference, spaced radially outwardly directed splines and a retaining groove, wherein said outer clutch housing splines engage said rotor splines and said rotor retaining groove and said outer clutch housing retaining groove are in opposing relation to receive a retaining ring to cooperatively maintain an axial position of said rotor with respect to said outer clutch housing.

31. The locking hub assembly of claim 30 wherein said second rotatable assembly comprises:

a hub sleeve surrounding a portion of the power driven axle outboard of an axle retaining ring, said hub sleeve of a tubular member having external spaced circumferential splines and inner spaced circumferential splines, said inner hub sleeve splines engaging said axle splines; and an axially movable rotating member including a tubular member and a radially extending rim having about an external circumference, spaced radially outwardly extending teeth and at least two opposing flat surfaces extending longitudinally between opposing two pairs of teeth and along said tubular member, and about an inner circumference, spaced longitudinally extending splines; said rotating member inner splines engaging said splines of said hub sleeve.

32. The locking hub assembly of claim 16 further comprising a means for synchronizing said rotating member with said first rotatable assembly.

33. The locking hub assembly of claim 32 wherein said synchronizing means comprises a synchronizer assembly including:

a synchronizer collar in communication with said rotating member, said synchronizer collar of a tubular-like shape having splines spaced about an inner circumference thereof;

at least three struts extending parallel with said splines and spaced about the inner circumference of said synchronizer collar; and a conical shape ring integral with said first rotatable assembly, said conical shape ring having a conical braking surface at an inboard end of an outer diameter of said ring and a plurality of spaced radially outwardly directed teeth at an outboard end of the outer diameter of said ring; whereby as said rotating member moves from the second position to the first position said synchronizer collar moves outboard such that the forward end of said struts fictionally engage said conical braking surface of said conical shape ring causing deceleration of said second rotatable assembly and engagement of said synchronizer collar splines and said teeth of said conical shape ring.

34. A locking hub assembly operatively engaging and disengaging a power driven axle to a wheel, the locking hub assembly comprising:

a) a first rotatable assembly in communication with the wheel;

b) a second rotatable assembly in communication with the power driven axle, said second rotatable assembly including an axially movable rotating member;

c) a means for moving the rotating member axially between a first position, wherein said first rotatable assembly operatively engages said second rotatable assembly, and a second position, wherein said first rotatable assembly is disengaged from said second rotatable assembly, wherein said moving means includes a cam assembly rotatable about said second rotatable assembly including a contoured outer rim having at least one v-shape notch to form a low height edge portion and a high height edge portion, an engaging spring and a return spring for yieldably biasing said rotating member between said first position and said second position, and an axially movable cam follower rotatable with said axle and responsive to said contoured outer rim of said cam assembly, and d) a nonrotatable electro-magnetic means fixed for non-rotation about the axle for activating said moving means, whereby said electro-magnetic means activates said moving means by locking said cam assembly against rotation to cause said cam follower to move axially as said cam follower rotates between said high height edge portion, such that said cam follower compresses said return spring enabling said engaging spring to axially move said rotating member to the first position; and said low height edge portion, such that said cam follower releases said return spring to axially move said rotating member to the second position thereby compressing said engaging spring.

35. The locking hub assembly of claim 34 wherein said cam assembly comprises:

a clutch plate juxtaposed said electromagnetic activating means, said clutch plate including a flange contoured to include at least two opposing ramp surfaces;

a reaction hub juxtaposed said clutch plate, said reaction hub having a scalloped rim for matching engagement with said ramp surfaces; and a cam ramp secured to or integral with said reaction hub, said cam ramp including said contoured outer rim having formed therein at least one v-shaped notch to form a low height edge portion and a high height edge portion.

36. The locking hub assembly of claim 34 wherein said cam assembly comprises:

a clutch plate juxtaposed said electromagnetic activating means; and a reaction hub juxtaposed said clutch plate, and a spring disposed between said clutch plate and said reaction hub for biasing said clutch plate against said electro-magnetic means.

37. The locking hub assembly of claim 35 further comprising a spring disposed between said clutch plate and said reaction hub for biasing said clutch plate against said electro-magnetic means.

38. A method of actuating a locking hub assembly for operatively engaging and disengaging a power driven axle to a wheel, the locking hub assembly including a first rotatable assembly in communication with the wheel, a second rotatable assembly in communication with the power driven axle, the second rotatable assembly including an axially movable rotating member, a means for moving the rotating member axially between a first position, wherein the first rotatable assembly operatively engages the second rotatable assembly, and a second position, wherein the first rotatable assembly is disengaged from the second rotatable assembly including a contoured outer rim having at least one v-shape notch to form a low height edge portion and a high height edge portion, an engaging spring and a return spring for yieldably biasing said rotating member between the first position and the second position; and an axially movable cam follower rotatable with the axle and responsive to the contoured outer rim of the cam assembly; and a nonrotatable electromagnetic means fixed for nonrotation about the axle for activating the moving means fixed for nonrotation about the axle for activating the moving means, the method comprising the steps of:

energizing the electro-magnetic means;

locking the cam assembly against rotation in response to the energized electromagnetic means to provide a stationery contoured circular outer rim having a high height edge portion and a low height edge portion;

rotating the cam follower about the contoured outer rim of the locked cam assembly;

moving the rotating cam follower axially in response to the high height edge portion and the low height edge portion, wherein at the high height edge portion the cam follower compresses the return spring allowing the engaging spring to expand to provide an increasing engaging force and at the low height edge portion the cam follower allows the return spring to expand and compresses the engaging spring to provide an increased return force; and moving the rotating member axially in response to the increased engaging force and the increased return force respectively such that said rotating member moves axially between a first position, wherein the first rotatable assembly operatively engages the second rotatable assembly, and a second position, wherein the first rotatable assembly is disengaged form the second rotatable assembly.

39. A power transmitting assembly having a first drive member and a second drive member that are mounted on a fixed support and a lock for locking the first drive member and the second drive member together so that the drive members rotate in unison with respect to the support, the power transmitting assembly comprising:

a first rotatable assembly in communication with the first drive member, a second rotatable assembly in communication with the second drive member, the second rotatable assembly including an axially movable rotating member, means including a rotatable cam for moving the rotating member axially between a first position, wherein the first rotatable assembly operatively engages the second rotatable assembly, and a second position, wherein the first rotatable assembly disengages from the second rotatable assembly; and a non rotatable electromagnetic means attached to the fixed support for nonrotation with respect to the first drive member and the second drive member for retarding rotation of the cam to activate the moving means.

40. The power transmitting assembly of claim 39 further including a cam follower; and wherein the cam has a contoured outer rim that has a low height edge portion and a high height edge portion, the high height edge portion being engaged by the cam follower for moving the rotating member from the second position to the first position.

41. The power transmitting assembly of claim 39 further including a return spring for yieldably biasing the rotating member toward said second position; and wherein the moving means disables the return spring for moving the rotating member from the second position to the first position.

42. The power transmitting assembly of claim 39 further including a return spring for yieldably biasing the rotating member toward said second position and a cam follower; and wherein the cam has a contoured outer rim that a low height edge portion and a high height edge portion, the high height edge portion being engaged by the cam follower for disabling the return spring for moving the rotating member from the second position to the first position.

43. A power transmitting assembly having a first drive member and a second drive member that are mounted on a fixed support and a lock for locking the first drive member and the second drive member together so that the drive members rotate in unison with respect to the support, the power transmitting assembly comprising:

a first rotatable assembly in communication with the first drive member, a second rotatable assembly in communication with the second drive member, the second rotatable assembly including an axially movable rotating member, means for moving the rotating member axially between a first position, wherein the first rotatable assembly operatively engages the second rotatable assembly, and a second position, wherein the first rotatable assembly disengages from the second rotatable assembly; and a non rotatable electromagnetic means attached to the fixed support for nonrotation with respect to the first drive member and the second drive member for activating the moving means, the moving means comprising;

a cam assembly rotatable about said second rotatable assembly including a contoured outer rim having at least one V-shape notch to form a low height edge portion and a high height edge portion;

a return spring for yieldably biasing the rotating member toward said second position; and an axially movable cam follower rotatable with the second rotatable assembly and responsive to the contoured outer rim of the cam assembly; whereby the electromagnetic means activates the moving means by locking the cam assembly against rotation to cause the cam follower to move axially as the cam follower rotates between said low height edge portion and high height edge portion and compresses the return spring enabling axial movement of the rotating member to the first position.

44. The power transmitting assembly of claim 43 wherein the moving means further comprises an engaging spring for axially moving the rotating member to the first position, wherein the cam assembly comprises a clutch plate juxtaposed the electromagnetic means and a cam ramp that includes a contoured outer rim having two V-shaped notches forming a low height edge portion and a high height edge portion, wherein the cam follower comprises two prong members that extend over the rotating member and provide a reaction surface to compress the return spring as the cam follower moves axially forward, and wherein the power transmitting assembly further comprises a spring disposed between the clutch plate and the reaction hub for biasing the clutch plate against the electromagnetic means.

45. A power transmitting assembly having a first drive member and a second drive member that are mounted on a fixed support and a lock for locking the first drive member and the second drive member together so that the drive members rotate in unison with respect to the support, the power transmitting assembly comprising:

a first rotatable assembly in communication with the first drive member, a second rotatable assembly in communication with the second drive member, the second rotatable assembly including an axially movable rotating member, means for moving the rotating member axially between a first position, wherein the first rotatable assembly operatively engages the second rotatable assembly, and a second position, wherein the first rotatable assembly disengages from the second rotatable assembly, a non rotatable electromagnetic means attached to the fixed support for nonrotation with respect to the first drive member and the second drive member for activating the moving means, and means for determining the position of the rotating member for controlling the electromagnetic means in response to the position of the rotating member.

46. The power transmitting assembly of claim 45 wherein the electromagnetic means is energized to activate the moving means for moving the rotating member axially to the first position or to the second position and wherein the means for determining the position of the rotating member deenergizes the electromagnetic means after the rotating member is moved axially to the first position or to the second position.

47. A differential assembly having a first drive member and a second drive member that are mounted in a housing and a lock for locking the first drive member and the second drive member together so that the drive members rotate in unison in the housing, the differential assembly comprising:

a first rotatable assembly in communication with the first drive member, a second rotatable assembly in communication with the second drive member, the second rotatable assembly including an axially movable rotating member, means for moving the rotating member axially between a first position, wherein the first rotatable assembly operatively engages the second rotatable assembly, and a second position, wherein the first rotatable assembly disengages from the second rotatable assembly, a non rotatable electromagnetic means attached to the housing for nonrotation with respect to the first drive member and the second drive member for activating the moving means, and a means for determining the position of the rotating member for controlling the electromagnetic means in response to the position of the rotating member.

48. The differential assembly of claim 47 wherein said moving means comprises:

a cam assembly rotatable about said second rotatable assembly including a contoured outer rim having at least one V-shape notch to form a low height edge portion and a high height edge portion;

a return spring for yieldably biasing the rotating member toward said second position; and an axially movable cam follower rotatable with the second rotatable assembly and responsive to the contoured outer rim of the cam assembly; whereby the electromagnetic means activates the moving means by locking the cam assembly against rotation to cause the cam follower to move axially as the cam follower rotates between said low height edge portion and high height edge portion and compresses the return spring enabling axial movement of the rotating member to the first position.

49. The differential assembly of claim 48 wherein the moving means further comprises an engaging spring for axially moving the rotating member to the first position, wherein the cam assembly comprises a clutch plate juxtaposed the electromagnetic means and a cam ramp that includes a contoured outer rim having two V-shaped notches forming a low height edge portion and a high height edge portion, wherein the cam follower comprises two prong members that extend over the rotating member and provide a reaction surface to compress the return spring as the cam follower moves axially forward, and wherein the differential assembly further comprises a spring disposed between the clutch plate and the reaction hub for biasing the clutch plate against the electromagnetic means.

50. The differential assembly of claim 49 wherein the means for determining the position of the rotating members detects the relative angular displacement of the cam follower with respect to the cam assembly and wherein the electromagnetic means is energized to activate the moving means for moving the rotating member axially to the first position or to the second position and wherein the means for determining the position of the rotating member deenergizes the electromagnetic means after the rotating member is moved axially to the first position or to the second position.

51. The differential assembly of claim 50 wherein the first rotatable assembly comprises an outer clutch housing of tubular shape having internal teeth, and wherein the axially movable rotating member of the second rotatable assembly has external teeth that engage the internal teeth of the first rotatable assembly when the rotating member is in the first position.

* * * * *